(12) United States Patent
Ohtake et al.

(10) Patent No.: US 7,924,509 B2
(45) Date of Patent: Apr. 12, 2011

(54) VARIABLE FOCAL LENGTH LENS SYSTEM AND IMAGING APPARATUS

(75) Inventors: Motoyuki Ohtake, Saitama (JP); Masayuki Murata, Tokyo (JP); Hiroshi Omichi, Tokyo (JP); Hiroki Hagiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/654,666

(22) Filed: Dec. 29, 2009

(65) Prior Publication Data
US 2010/0195217 A1    Aug. 5, 2010

(30) Foreign Application Priority Data
Feb. 4, 2009  (JP) ................. 2009-023705

(51) Int. Cl.
*G02B 15/14*    (2006.01)
(52) U.S. Cl. ......... 359/687; 359/686
(58) Field of Classification Search ........... 359/676–687
See application file for complete search history.

(56) References Cited

U.S. PATENT DOCUMENTS

| 7,542,212 | B2* | 6/2009 | Toyoda et al. | 359/676 |
| 2006/0132928 | A1* | 6/2006 | Nakatani et al. | 359/687 |
| 2009/0168179 | A1* | 7/2009 | Toyoda | 359/557 |
| 2010/0033838 | A1* | 2/2010 | Saori | 359/684 |

FOREIGN PATENT DOCUMENTS

| JP | 07-005361 A | 1/1995 |
| JP | 11-311743 A | 11/1999 |
| JP | 2000-267006 A | 9/2000 |
| JP | 2007-094174 | 4/2007 |
| JP | 2008-046208 | 2/2008 |
| JP | 2008-102165 | 5/2008 |
| JP | 2008-146016 | 6/2008 |
| JP | 2009-139701 A | 6/2009 |
| JP | 2009-186983 A | 8/2009 |

* cited by examiner

*Primary Examiner* — Darryl J Collins
(74) *Attorney, Agent, or Firm* — Rader, Fishman & Grauer PLLC

(57) ABSTRACT

A variable focal length lens system includes first to fourth lens groups which have positive, negative, positive, and positive refractive powers, respectively, and are arranged in this order from an object side to an image side. An aperture diaphragm is arranged in the vicinity of the third lens group. The variable focal length lens system satisfies the following Conditional expressions 1 and 2:

$-0.04 < fw/R23 < 0.18$, and    [Conditional expression 1]

$0.48 < fw/R24 < 0.72$    [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

19 Claims, 18 Drawing Sheets

VARIABLE FOCAL LENGTH LENS SYSTEM AND IMAGING APPARATUS

BACKGROUND OF THE INVENTION

1. Field of the Invention

The present invention relates to a variable focal length lens system and an imaging apparatus. More particularly, the present invention relates to a variable focal length lens system and an imaging apparatus that are used in, for example, a video camera or a digital still camera and have an angle of view of more than 70 degrees and a zoom ratio of more than 10.

2. Description of the Related Art

A method has been proposed which converts the quantity of light of an object image which is formed on an imaging device surface of an imaging device including a photoelectric conversion element, such as a CCD (charge coupled device) or a CMOS (complementary metal-oxide semiconductor), as an imaging unit of a camera into an electric output using each photoelectric conversion element and records the electric output.

With the progress of microfabrication techniques, the process speed of a central processing unit (CPU) or the degree of integration of a recording medium has increased, which makes it possible to process a large amount of image data at a high speed. In addition, with an increase in the degree of integration of light-receiving elements, it is possible to record data at a high spatial frequency. With a reduction in the size of the light-receiving element, it is possible to reduce the overall size of a camera.

However, when the degree of integration increases and size is reduced, the area of a light-receiving surface of each photoelectric conversion element is reduced and the electric output is lowered. As a result, the influence of noise on the photoelectric conversion element increases. In order to reduce the influence of noise, a structure has been proposed which increases the aperture ratio of an optical system to increase the amount of light incident on the light-receiving element. In addition, a structure has been proposed in which a micro lens element, which is called a micro lens array, is provided immediately before each element.

The micro lens array restricts the position of an exit pupil of the lens system, instead of guiding rays incident between adjacent elements onto the elements. When the position of the exit pupil of the lens system is close to the light-receiving element, an angle between a principal ray incident on the light-receiving element and the optical axis is increased. Therefore, an angle between an off-axis ray traveling to the periphery of a screen and the optical axis is increased. As a result, a necessary amount of light is not incident on the light-receiving element and the amount of light is insufficient.

In recent years, with the wide spread use of digital cameras, there have been various demands from the users.

In particular, there is demand for a small-sized camera with a high zoom ratio zoom lens (variable focal length lens system). A zoom lens having a zoom ratio of more than 10 has been provided.

In general, a zoom lens having a high zoom ratio includes four lens groups with positive, negative, positive, and positive refractive powers.

In the zoom lens including the four lens groups with positive, negative, positive, and positive refractive powers, four lens groups, that is, a first lens group with a positive refractive power, a second lens group with a negative refractive power, a third lens group with a positive refractive power, and a fourth lens group with a positive refractive power are arranged in this order from an object side to an image side. In the zoom lens including the four lens groups with positive, negative, positive, and positive refractive powers, when the position of the lens is changed from a wide-angle end with the shortest focal length to a telephoto end with the longest focal length, the first to third lens groups are moved such that the gap between the first lens group and the second lens group increases and the gap between the second lens group and the third lens group decreases. The fourth lens group is moved to compensate a variation in the position of an image surface.

For example, Japanese Unexamined Patent Application Publication No. 2008-146016 discloses such a zoom lens including four lens groups with positive, negative, positive, and positive refractive powers.

In recent years, wide-angle zoom lenses with an angle of view of more than 75 degrees have increased. As the wide-angle zoom lens, a zoom lens having a first lens group with a negative refractive power has been generally used.

For example, Japanese Unexamined Patent Application Publication No. 2007-94174 discloses a zoom lens in which two lens groups, that is, a first lens group with a negative refractive power and a second lens group with a positive refractive power, are arranged in this order from the object side to the image side.

Japanese Unexamined Patent Application Publication No. 2008-46208 discloses a zoom lens in which four lens groups, that is, a first lens group with a negative refractive power, a second lens group with a positive refractive power, a third lens group with a negative refractive power, and a fourth lens group with a positive refractive power, are arranged in this order from the object side to the image side.

In recent years, an aspheric lens has generally been used. A zoom lens including a first lens group with a positive refractive power has generally been used.

For example, Japanese Unexamined Patent Application Publication No. 2008-102165 discloses a zoom lens that includes a first lens group with a positive refractive power and uses aspheric lenses to achieve a wide angle of view and a high variable power.

SUMMARY OF THE INVENTION

However, in the zoom lens having the first lens group with the negative refractive power, when an angle of view of more than 75 degrees and a high zoom ratio of about 10 are obtained, rays are diffused at the telephoto end, and the diameter of the ray passing through each lens group after the second lens group is increased. Therefore, it is necessary to more effectively correct spherical aberration. As a result, it is difficult to sufficiently reduce the overall length of the lens or the diameter thereof.

In the zoom lens including four lens groups with positive, negative, positive, and positive refractive powers, the above-mentioned problems do not arise, but an off-axis ray incident on the first lens group at the wide-angle end is emitted at a large angle with respect to the optical axis. As a result, the lens diameter of the first lens group increases, and performance is likely to deteriorate significantly due to the eccentricity between the first lens group and the second lens group.

Therefore, for example, in the zoom lens disclosed in Japanese Unexamined Patent Application Publication No. 2008-102165, there are restrictions in ensuring an angle of view of about 75 degrees.

It is desirable to provide a variable focal length lens system and an imaging apparatus having a small size and capable of achieving a high variable power and a wide angle of view.

According to an embodiment of the invention, there is provided a variable focal length lens system including: a first lens group with a positive refractive power; a second lens group with a negative refractive power; a third lens group with a positive refractive power; and a fourth lens group with a positive refractive power. The first to fourth lens groups are arranged in this order from an object side to an image side. When the position of a lens is changed from a wide-angle end to a telephoto end, a gap between the first lens group and the second lens group increases, a gap between the second lens group and the third lens group decreases, and a gap between the third lens group and the fourth lens group is changed. When the position of the lens is changed from the wide-angle end to the telephoto end, all of the lens groups are moved. An aperture diaphragm is arranged in the vicinity of the third lens group. The fourth lens group is moved during close-distance focusing. The second lens group includes a negative lens having a concave surface facing an image side and a cemented lens of a negative lens having a concave surface facing the image side and a meniscus-shaped positive lens having a convex surface facing the object side arranged in this order from the object side to the image side. A surface, which is closest to the object side, of the negative lens arranged on the object side in the second lens group and a surface of the cemented lens closest to the image side are aspheric surfaces. The variable focal length lens system satisfies the following Conditional expressions 1 and 2:

$-0.04 < fw/R23 < 0.18$, and  [Conditional expression 1]

$0.48 < fw/R24 < 0.72$  [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

Therefore, in the variable focal length lens system, a necessary aberration correcting function is ensured and particularly, the thickness of the second lens group is reduced.

The variable focal length lens system according to the above-mentioned embodiment may satisfy the following Conditional expression 3:

$0.01 < fw/f2c < 0.09$  [Conditional expression 3]

(where f2c indicates the focal length of the cemented lens in the second lens group).

Since the variable focal length lens system satisfies Conditional expression 3, it is possible to effectively correct high-order off-axis aberration in the periphery of the screen and a variation in off-axis aberration due to a change in the position of the lens.

The variable focal length lens system according to the above-mentioned embodiment may satisfy the following Conditional expression 4:

$2.3 < f1/(fw \cdot ft)^{1/2} < 2.7$  [Conditional expression 4]

(where f1 indicates the focal length of the first lens group and ft indicates the focal length of the entire lens system at the telephoto end).

Since the variable focal length lens system satisfies Conditional expression 4, it is possible to reduce the overall length of the first lens group at the telephoto end and effectively correct negative spherical aberration occurring in the first lens group.

The variable focal length lens system according to the above-mentioned embodiment may satisfy the following Conditional expression 5:

$0.65 < f1/f1c < 0.9$  [Conditional expression 5]

(where f1c indicates the focal length of the second positive lens in the first lens group).

Since the variable focal length lens system satisfies Conditional expression 5, the off-axis ray incident on the first lens group at the wide-angle end is close to the optical axis and the position of a principal point of the first lens group is close to the object side.

In the variable focal length lens system according to the above-mentioned embodiment, the aperture diaphragm may be arranged on the object side of the third lens group. When the position of the lens is changed, the aperture diaphragm may be moved integrally with the third lens group. The variable focal length lens system may satisfy the following Conditional expression 6:

$0.06 < dS3/R31 < 0.10$  [Conditional expression 6]

(where dS3 indicates a distance between the aperture diaphragm and a surface closest to the object side in the third lens group along an optical axis and R31 indicates the curvature radius of the surface closest to the object side in the third lens group).

Since the variable focal length lens system has the above-mentioned structure and satisfies Conditional expression 6, negative spherical aberration occurring in the third lens group is effectively corrected and the total length of the third lens group at the telephoto end is reduced.

The variable focal length lens system according to the above-mentioned embodiment may satisfy the following Conditional expression 7:

$2 < f3/fw < 2.3$  [Conditional expression 7]

(where f3 indicates the focal length of the third lens group).

Since the variable focal length lens system satisfies Conditional expression 7, a variation in comatic aberration due to a change in the angle of view at the wide-angle end is effectively corrected and the overall length of the lens system is reduced regardless of the position of the lens.

According to another embodiment of the invention, there is provided an imaging apparatus including: a variable focal length lens system; and an imaging device configured to convert an optical image formed by the variable focal length lens system into an electric signal. The variable focal length lens system includes: a first lens group with a positive refractive power; a second lens group with a negative refractive power; a third lens group with a positive refractive power; and a fourth lens group with a positive refractive power. The first to fourth lens groups are arranged in this order from an object side to an image side. When the position of a lens is changed from a wide-angle end to a telephoto end, a gap between the first lens group and the second lens group increases, a gap between the second lens group and the third lens group decreases, and a gap between the third lens group and the fourth lens group is changed. When the position of the lens is changed from the wide-angle end to the telephoto end, all of the lens groups are moved. An aperture diaphragm is arranged in the vicinity of the third lens group. The fourth lens group is moved during close-distance focusing. The second lens group includes a negative lens having a concave surface facing an image side and a cemented lens of a negative lens having a concave surface facing the image side and a meniscus-shaped positive lens having a convex surface facing the object side arranged in this order from the object side to the image side.

A surface, which is closest to the object side, of the negative lens arranged on the object side in the second lens group and a surface of the cemented lens closest to the image side are aspheric surfaces. The variable focal length lens system satisfies the following Conditional expressions 1 and 2:

$-0.04 < fw/R23 < 0.18$, and  [Conditional expression 1]

$0.48 < fw/R24 < 0.72$  [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

Therefore, in the imaging apparatus, a necessary aberration correcting function is ensured and particularly, the thickness of the second lens group is reduced.

According to an embodiment of the invention, a variable focal length lens system includes: a first lens group with a positive refractive power; a second lens group with a negative refractive power; a third lens group with a positive refractive power; and a fourth lens group with a positive refractive power. The first to fourth lens groups are arranged in this order from an object side to an image side. When the position of a lens is changed from a wide-angle end to a telephoto end, a gap between the first lens group and the second lens group increases, a gap between the second lens group and the third lens group decreases, and a gap between the third lens group and the fourth lens group is changed. When the position of the lens is changed from the wide-angle end to the telephoto end, all of the lens groups are moved. An aperture diaphragm is arranged in the vicinity of the third lens group. The fourth lens group is moved during close-distance focusing. The second lens group includes a negative lens having a concave surface facing an image side and a cemented lens of a negative lens having a concave surface facing the image side and a meniscus-shaped positive lens having a convex surface facing the object side arranged in this order from the object side to the image side. A surface, which is closest to the object side, of the negative lens arranged on the object side in the second lens group and a surface of the cemented lens closest to the image side are aspheric surfaces. The variable focal length lens system satisfies the following Conditional expressions 1 and 2:

$-0.04 < fw/R23 < 0.18$, and  [Conditional expression 1]

$0.48 < fw/R24 < 0.72$  [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

Therefore, it is possible to ensure a necessary aberration correcting function and reduce the thickness of a lens. In addition, it is possible to achieve a small size, a high variable power, and a wide angle of view.

The variable focal length lens system according to the above-mentioned embodiment satisfies the following Conditional expression 3:

$0.01 < fw/f2c < 0.09$  [Conditional expression 3]

(where f2c indicates the focal length of the cemented lens in the second lens group).

Therefore, it is possible to prevent the occurrence of high-order off-axis aberration in the periphery of the screen and effectively correct a variation in off-axis aberration due to a change in the position of the lens. Therefore, it is possible to further improve the performance.

In the variable focal length lens system according to the above-mentioned embodiment, the first lens group includes a negative lens having a concave surface facing the image side, a first positive lens having a convex surface facing the object side, and a second positive lens having a convex surface facing the object side arranged in this order from the object side to the image side. The variable focal length lens system satisfies the following Conditional expression 4:

$2.3 < f1/(fw \cdot ft)^{1/2} < 2.7$  [Conditional expression 4]

(where f1 indicates the focal length of the first lens group and ft indicates the focal length of the entire lens system at the telephoto end).

Therefore, it is possible to reduce the overall length of the first lens group at the telephoto end and effectively correct negative spherical aberration occurring in the first lens group.

The variable focal length lens system according to the above-mentioned embodiment satisfies the following Conditional expression 5:

$0.65 < f1/f1c < 0.9$  [Conditional expression 5]

(where f1c indicates the focal length of the second positive lens in the first lens group).

Therefore, it is possible to prevent the occurrence of comatic aberration in the periphery of the screen and reduce the overall length of the first lens group at the telephoto end.

In the variable focal length lens system according to the above-mentioned embodiment, the aperture diaphragm is arranged on the object side of the third lens group. When the position of the lens is changed, the aperture diaphragm is moved integrally with the third lens group. The variable focal length lens system satisfies the following Conditional expression 6:

$0.06 < dS3/R31 < 0.10$  [Conditional expression 6]

(where dS3 indicates a distance between the aperture diaphragm and a surface closest to the object side in the third lens group along an optical axis and R31 indicates the curvature radius of the surface closest to the object side in the third lens group).

Therefore, it is possible to effectively correct negative spherical aberration occurring in the third lens group and reduce the overall length of the third lens group at the telephoto end.

The variable focal length lens system according to the above-mentioned embodiment satisfies the following Conditional expression 7:

$2 < f3/fw < 2.3$  [Conditional expression 7]

(where f3 indicates the focal length of the third lens group).

Therefore, it is possible to effectively correct a variation in comatic aberration at the wide-angle end and reduce the overall length of the lens system regardless of the position of the lens.

According to another embodiment of the invention, an imaging apparatus includes: a variable focal length lens system; and an imaging device configured to convert an optical image formed by the variable focal length lens system into an electric signal. The variable focal length lens system includes: a first lens group with a positive refractive power; a second lens group with a negative refractive power; a third lens group with a positive refractive power; and a fourth lens group with a positive refractive power. The first to fourth lens groups are arranged in this order from an object side to an image side. When the position of a lens is changed from a wide-angle end to a telephoto end, a gap between the first lens group and the second lens group increases, a gap between the second lens group and the third lens group decreases, and a gap between the third lens group and the fourth lens group is changed. When the position of the lens is changed from the wide-angle end to the telephoto end, all of the lens groups are moved. An aperture diaphragm is arranged in the vicinity of the third lens group. The fourth lens group is moved during close-distance focusing. The second lens group includes a negative lens having a concave surface facing an image side and a cemented lens of a negative lens having a concave surface facing the image side and a meniscus-shaped positive lens having a convex surface facing the object side arranged in this order from the object side to the image side. A surface, which is closest to the object side, of the negative lens arranged on the object side in the second lens group and a surface of the cemented lens closest to the image side are aspheric surfaces. The variable focal length lens system satisfies the following Conditional expressions 1 and 2:

−0.04<$fw/R23$<0.18, and　　　　[Conditional expression 1]

0.48<$fw/R24$<0.72　　　　[Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

Therefore, it is possible to ensure a necessary aberration correcting function and reduce the thickness of a lens. In addition, it is possible to achieve a small size, a high variable power, and a wide angle of view.

DESCRIPTION OF THE PREFERRED EMBODIMENTS

Figure 1:
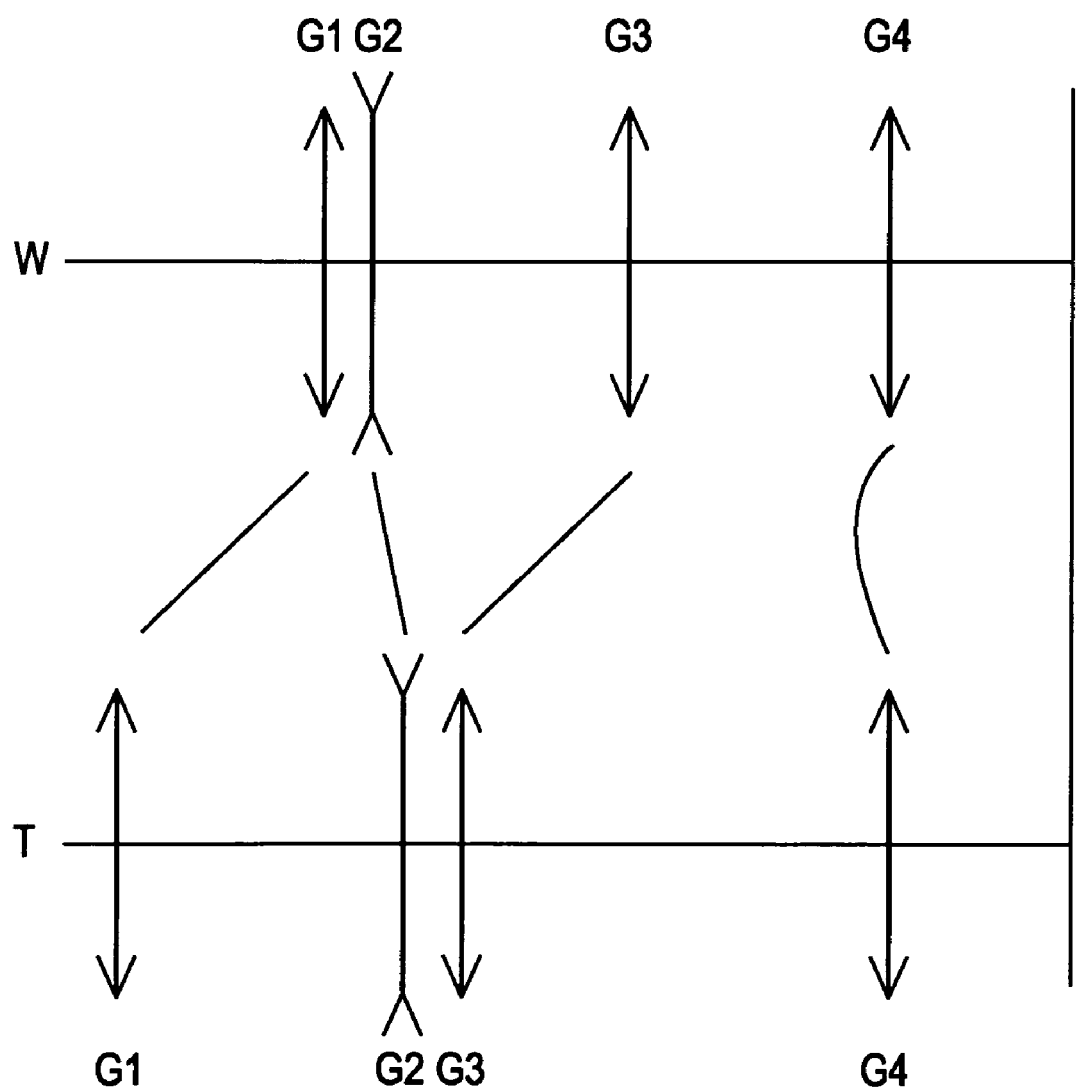
FIG. 1 is a diagram illustrating exemplary embodiments for implementing an imaging apparatus and a variable focal length lens system according to the invention together with FIGS. 2 to 18, and shows the distribution of the refractive power of the variable focal length lens system.

Hereinafter, a variable focal length lens system and an imaging apparatus according to exemplary embodiments of the invention will be described.

[Structure of Variable Focal Length Lens System]

First, a variable focal length lens system according to an embodiment of the invention will be described.

The variable focal length lens system according to the embodiment of the invention includes a first lens group with a positive refractive power, a second lens group with a negative refractive power, a third lens group with a positive refractive power, and a fourth lens group with a positive refractive power arranged in this order from an object side to an image side.

In the variable focal length lens system according to the embodiment of the invention, when the position of a lens is changed from a wide-angle end to a telephoto end, the gap between the first lens group and the second lens group increases and the gap between the second lens group and the third lens group decreases. Therefore, the gap between the third lens group and the fourth lens group is changed.

In the variable focal length lens system according to the embodiment of the invention, when the position of the lens is changed from the wide-angle end to the telephoto end, all of the lens groups are moved. An aperture diaphragm is arranged in the vicinity of the third lens group, and the fourth lens group is moved during close-distance focusing.

Next, the function of each lens group of the variable focal length lens system according to the embodiment of the invention will be described.

In the variable focal length lens system according to the embodiment of the invention, the first lens group and the second lens group are close to each other at the wide-angle end such that an off-axis ray incident on the first lens group is close to the optical axis. As a result, it is possible to reduce the diameter of the lens. When the position of the lens is changed from the wide-angle end to the telephoto end, the gap between the first lens group and the second lens group increases, and the off-axis ray passing through the first lens group is far away from the optical axis.

The variable focal length lens system according to the embodiment of the invention effectively corrects a variation in off-axis aberration due to a change in the position of the lens, using a variation in the height of the off-axis light ray. In particular, the overall length of the lens is decreased at the wide-angle end and is increased at the telephoto end such that the off-axis ray incident on the first lens group is not excessively far away from the optical axis at the wide-angle end where an angle of view is large. In addition, the gap between the second lens group and the third lens group is increased at the wide-angle end such that the off-axis ray passing through the second lens group is far away from the optical axis. As a result, it is possible to independently correct on-axis aberration and off-axis aberration.

When the position of the lens is changed to the telephoto, the gap between the second lens group and the third lens group is reduced such that the off-axis ray passing through the second lens group is close to the optical axis. As a result, it is possible to effectively correct a variation in off-axis aberration due to a change in the position of the lens and thus improve performance of a lens system.

Since the fourth lens group is arranged close to an image surface, there is a little variation in lateral magnification due to movement, and the fourth lens group is moved so as to correct a variation in the position of the image surface due to the movement of the first to third lens groups.

In a lens suitable for an imaging apparatus (camera) that captures the image of an object using an imaging device, the position of an exit pupil is far away from the image surface, that is, a principal ray is substantially parallel to the optical axis. Therefore, when a ray passing through the fourth lens group travels in the optical axis direction, there is a little variation in the height of the ray. Since there is a little variation in the height of the ray, the fourth lens group is suitable for a so-called close-distance focusing operation that compensates a variation in the position of the image surface occurring when the position of an object is changed.

For the above-mentioned reason, in the variable focal length lens system according to the embodiment of the invention, the fourth lens group is moved during close-distance focusing.

The position of the aperture diaphragm is important in order to reduce the diameter of the lens and improve performance thereof.

In general, when the position of the lens is changed, as the number of lens groups having a variable distance from the aperture diaphragm is increased, the height of the off-axis ray passing through each lens group is more likely to be changed. A variation in off-axis aberration due to a change in the position of the lens is corrected on the basis of a variation in the height of the off-axis ray. However, it is possible to more effectively correct the variation in off-axis aberration by actively changing the height of the off-axis ray. In addition, it is possible to reduce the diameter of the lens by arranging the aperture diaphragm in the vicinity of the center of the lens system.

In the variable focal length lens system according to the embodiment of the invention, as described above, it is possible to reduce the diameter of the lens and improve performance thereof by arranging the aperture diaphragm in the vicinity of the third lens group.

It is possible to further reduce the diameter of the lens and simplify a barrel structure by arranging the aperture diaphragm on the object side of the third lens group and integrally moving the aperture diaphragm and the third lens group when the position of the lens is changed.

It is possible to make the off-axis ray passing through the first lens group close to the optical axis particularly at the wide-angle end by arranging the aperture diaphragm on the object side of the third lens group. Therefore, it is possible to reduce the size of the lens. Since the off-axis ray passing through the first lens group is close to the optical axis at the wide-angle end, it is possible to prevent the occurrence of comatic aberration in the periphery of a screen and thus improve performance of the lens.

In order to obtain a lens with a high variable power and a small size, it is effective to strengthen the refractive power of each lens group. However, when the refractive power of each lens group is strengthened, the curvatures of the surfaces of the lenses in each lens group are increased. Therefore, when a wide angle of view is obtained after a high variable power and a reduction in size have been achieved, a very large aberration occurs in the periphery of the screen.

The off-axis ray passing through the first lens group is likely to be far away from the optical axis at the wide-angle end in a type in which a lens group with a positive refractive power is arranged at the head. In particular, as the refractive power of the first lens group is increased, the off-axis ray passing through the first lens group is further away from the optical axis. As a result, a large comatic aberration occurs in the periphery of the screen.

Therefore, in order to obtain a wide angle of view after achieving a high variable power and a reduction in size, it is preferable to weaken the refractive power of the first lens group. However, when the refractive power of the first lens group is weakened, the overall length of the lens is increased. As a result, it is difficult to ensure a predetermined zoom ratio.

Therefore, in the variable focal length lens system according to the embodiment of the invention, in particular, the second lens group is configured as follows. In this case, it is possible to achieve a high variable power, a small size, and a wide angle of view, regardless of the position of a lens. Therefore, it is possible to ensure a high optical performance.

In particular, in the variable focal length lens system according to the embodiment of the invention, a wide angle of view of more than 70 degrees, a high variable power, and a small size are achieved at the wide-angle end.

In the variable focal length lens system according to the embodiment of the invention, in the second lens group, a negative lens (first negative lens) having a concave surface facing the image side, and a cemented lens of a negative lens (second negative lens) having a concave surface facing the image side and a meniscus-shaped positive lens having a convex surface facing the object side are arranged in this order from the object side to the image side. In addition, in the second lens group, an object-side surface of the first negative lens and a surface of the cemented lens closest to the image side are aspheric surfaces.

In particular, when the second lens group satisfies the following two points, a high optical performance is ensured.

(A) In the cemented lens, the negative lens (second negative lens) is arranged on the object side, the positive lens is arranged on the image side, and a cemented surface is convex toward the object side.

(B) The gap between the negative lens (first negative lens) and the cemented lens is narrow.

It is important to reduce the thickness of the second lens group in order to prevent the off-axis ray incident on the first lens group from being excessively away from the optical axis even when the angle of view is increased at the wide-angle end.

In the zoom lens according to the related art, in many cases, the second lens group includes three lenses, that is, a first negative lens having a concave surface facing the image side, a second negative lens having a concave surface facing the image side, and a positive lens having a convex surface facing the object side arranged in this order from the object side to the image side (for example, Japanese Unexamined Patent Application Publication No. 2008-209866).

However, in the structure according to the related art, when the gap between the second negative lens and the positive lens is reduced, performance deteriorates significantly due to eccentricity therebetween. Therefore, it is necessary to increase the gap between the second negative lens and the positive lens, reduce a variation in manufacturing processes, and prevent performance from being lowered. In addition, since the object-side surface of the second negative lens is a concave surface with strong curvature toward the object side, it is necessary to increase the gap between the first negative lens and the second negative lens. Therefore, in the structure according to the related art, the thickness of the second lens group is large.

Therefore, in the variable focal length lens system according to the embodiment of the invention, the thickness of the second lens group is reduced by clearly defining a function of correcting the aberration of each surface of the lenses in the second lens group.

That is, in the variable focal length lens system according to the embodiment of the invention, in the second lens group, the cemented lens includes the second negative lens and the positive lens, and the image-side surface of the positive lens is an aspheric surface, in order to correct on-axis aberration. In addition, the first negative lens is an aspheric lens in order to correct off-axis aberration, and the object-side surface of the second negative lens has a positive curvature, not a negative curvature (a concave surface is flat and a convex surface has a large curvature).

In the related art, the object-side surfaces of the first negative lens and the second negative lens have a function of correcting a variation in off-axis aberration due to a change in the angle of view at the wide-angle end, and the image-side surface of the second negative lens and the positive lens have a function of correcting on-axis aberration.

In the variable focal length lens system according to the embodiment of the invention, according to the above-mentioned structure, it is possible to reduce the thickness of the lens after ensuring a necessary aberration correcting function. Therefore, it is possible to reduce the size of the first lens group after ensuring a high optical performance.

In the variable focal length lens system according to the embodiment of the invention, since the aspheric lens is used, it is possible to achieve a higher optical performance. In particular, since the second lens group includes the aspheric lens, it is possible to effectively correct a variation in comatic aberration due to a change in the angle of view at the wide-angle end.

In the variable focal length lens system according to the embodiment of the invention, in the second lens group, at least two surfaces, that is, a surface, which is closest to the object side, of the negative lens (first negative lens) arranged on the object side and a surface of the cemented lens closest to the image side, are aspheric surfaces. Therefore, it is possible to reduce the size of a lens and improve performance thereof at the wide-angle end.

The following two methods have been proposed as a general method of using the aspheric surface.

(C) A method of using a surface arranged in the vicinity of the aperture diaphragm as an aspheric surface.

(D) A method of using a surface away from the aperture diaphragm as an aspheric surface.

In the case of (C), the aspheric surface is most suitable to correct spherical aberration. In the case of (D), the aspheric surface is most suitable to correct off-axis aberration, such as distortion or field curvature.

However, in the variable focal length lens system according to the embodiment of the invention, since two aspheric surfaces are arranged so as to be separated from each other in the second lens group, refractive power near the optical axis and refractive power away from the optical axis are independently corrected. Specifically, the position of an entrance pupil in a paraxial region and the position of an entrance pupil in the periphery of the screen are independently corrected. As a result, it is possible to make the off-axis ray incident on the first lens group close to the optical axis. Therefore, it is possible to reduce the diameter of a lens and effectively correct a variation in off-axis aberration due to a change in the angle of view.

The variable focal length lens system according to the embodiment of the invention satisfies the following Conditional expressions 1 and 2:

$$-0.04 < fw/R23 < 0.18, \text{ and} \qquad \text{[Conditional expression 1]}$$

$$0.48 < fw/R24 < 0.72 \qquad \text{[Conditional expression 2]}$$

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

Conditional expression 1 defines the shape of the object-side surface of the second negative lens in the second lens group and is for reducing the gap between the first negative lens and the second negative lens.

If the ratio is more than the upper limit of Conditional expression 1, the negative refractive power of the first negative lens is strengthened, and the positive refractive power of the cemented lens is strengthened. Therefore, it is difficult to effectively correct spherical aberration occurring in each of the first negative lens and the cemented lens and thus effectively correct a variation in spherical aberration due to a change in the position of a lens. As a result, it is difficult to improve performance of the lens.

On the other hand, if the ratio is less than the lower limit of Conditional expression 1, the negative refractive power of the cemented lens is strengthened. Therefore, the off-axis ray passing through the first negative lens is away from the optical axis, and the gap between the first negative lens and the cemented lens increases. As a result, the off-axis ray passing through the first negative lens is further away from the optical axis, which results in an increase in the diameter of a lens.

Therefore, when the variable focal length lens system satisfies Conditional expression 1, it is possible to effectively correct a variation in spherical aberration due to a change in the position of a lens and make the off-axis ray passing through the first negative lens close to the optical axis. As a result, it is possible to reduce the diameter of the lens. Conditional expression 2 defines the curvature radius of the image-side surface of the second negative lens in the second lens group and is for simplify the structure of the second lens group.

If the ratio is less than the lower limit of Conditional expression 2, a large high-order spherical aberration occurs in the cemented surface of the cemented lens. Therefore, it is difficult to obtain a predetermined optical performance.

On the other hand, if the ratio is more than the upper limit of Conditional expression 2, a function of correcting the aberration of the cemented surface of the cemented lens deteriorates. Therefore, it is difficult to obtain a predetermined optical performance.

Therefore, when the variable focal length lens system satisfies Conditional expression 2, it is possible to effectively correct aberrations occurring in the cemented surface of the cemented lens and obtain a predetermined optical performance.

In the variable focal length lens system according to the embodiment of the invention, it is preferable that the upper limit of Conditional expression 2 be 0.64 in order to reduce the thickness of the second lens group, make the off-axis ray passing through the first lens group close to the optical axis, and reduce the diameter of a lens.

When the cemented surface of the cemented lens in the second lens group is convex toward the aperture diaphragm, off-axis aberration occurs and the optical performance deteriorates. Therefore, as in the variable focal length lens system according to the embodiment of the invention, the cemented lens includes the negative lens having a concave surface facing the image side and the meniscus-shaped positive lens having a convex surface facing the object side. According to this structure, it is possible to obtain a good optical performance.

It is preferable that the variable focal length lens system according to the embodiment of the invention satisfy the above-mentioned Conditional expression 1 and the following Conditional expression 3:

$$0.01 < fw/f2c < 0.09 \quad \text{[Conditional expression 3]}$$

(where f2c indicates the focal length of the cemented lens in the second lens group).

Conditional expression 3 defines the focal length of the cemented lens in the second lens group and is for improving the performance.

If the ratio is less than the lower limit of Conditional expression 3, a large high-order off-axis aberration occurs in the periphery of the screen. Therefore, it is difficult to improve the performance.

On the other hand, if the ratio is more than the upper limit of Conditional expression 3, it is difficult to effectively correct a variation in off-axis aberration due to a change in the position of a lens and improve the performance.

Therefore, when the variable focal length lens system satisfies Conditional expression 3, it is possible to prevent the occurrence of high-order off-axis aberration in the periphery of the screen and effectively correct a variation in off-axis aberration due to a change in the position of a lens. Therefore, it is possible to further improve the performance.

However, in the variable focal length lens system according to the embodiment of the invention, it is preferable that the first lens group have a structure suitable to achieve a high variable power, a small size, and a high performance.

In order to achieve a high variable power, it is necessary to effectively correct chromatic aberration or spherical aberration since the focal length is large at the telephoto end. In order to improve the performance, it is necessary to effectively correct chromatic aberration and spherical aberration occurring in each lens group, and it is necessary to provide at least one positive lens and at least one negative lens in the first lens group.

In order to decrease the overall length of a lens at the telephoto end and reduce the diameter of the lens, it is preferable that the first lens group be configured such that three lenses, that is, a negative lens having a concave surface facing the image side, a first positive lens having a convex surface facing the object side, and a second positive lens having a convex surface facing the object side, are arranged in this order from the object side to the image side.

In the variable focal length lens system according to the embodiment of the invention, in the first lens group having the above-mentioned structure, since the negative lens is arranged closest to the image side, the off-axis ray incident on the first lens group is close to the optical axis. Since two positive lenses are arranged, the positive refractive power is strengthened and the overall length of the lens is reduced.

It is preferable that the variable focal length lens system according to the embodiment of the invention satisfy the following Conditional expression 4:

$$2.3 < f1/(fw \cdot ft)^{1/2} < 2.7 \quad \text{[Conditional expression 4]}$$

(where f1 indicates the focal length of the first lens group and ft indicates the focal length of the entire lens system at the telephoto end).

Conditional expression 4 defines the focal length of the first lens group and is for achieving a high variable power, a small size, and a high performance.

If the ratio is more than the upper limit of Conditional expression 4, the overall length of the first lens group increases at the telephoto end.

On the other hand, if the ratio is less than the lower limit of Conditional expression 4, it is difficult to effectively correct a negative spherical aberration occurring in the first lens group and improve the optical performance.

Therefore, when the variable focal length lens system satisfies Conditional expression 4, it is possible to reduce the overall length of the first lens group at the telephoto end and effectively correct the negative spherical aberration occurring in the first lens group.

However, in the variable focal length lens system according to the embodiment of the invention, it is preferable that the lower limit of Conditional expression 4 be 2.4 in order to make the off-axis ray passing through the first lens group close to the optical axis and reduce the diameter of the lens.

It is preferable that the negative lens and the first positive lens be bonded to each other in order to prevent the deterioration of performance due to an assembly error during manufacture and achieve a stable optical performance.

In order to obtain a high optical performance even when the angle of view is increased at the wide-angle end, it is preferable that the variable focal length lens system according to the embodiment of the invention satisfy the following Conditional expression 5:

$$0.65 < f1/f1c < 0.9 \quad \text{[Conditional expression 5]}$$

(where f1c indicates the focal length of the second positive lens in the first lens group).

Conditional expression 5 defines the focal length of the second positive lens in the first lens group and is for obtaining a good off-axis performance at the wide-angle end.

If the ratio is less than the lower limit of Conditional expression 5, the off-axis ray incident on the first lens group is away from the optical axis at the wide-angle end, and a large comatic aberration occurs in the periphery of the screen.

On the other hand, if the ratio is more than the upper limit of Conditional expression 5, the position of a principal point of the first lens group is moved to the image side. As a result, the overall length of the first lens group increases at the telephoto end.

Therefore, when the variable focal length lens system satisfies Conditional expression 5, it is possible to prevent the occurrence of comatic aberration in the periphery of the screen and reduce the overall length of the first lens group at the telephoto end.

In order to effectively correct a negative spherical aberration occurring in only the third lens group and reduce the overall length of the third lens group, it is preferable that the variable focal length lens system according to the embodiment of the invention satisfy the following Conditional expression 6:

$$0.06 < dS3/R31 < 0.10 \qquad \text{[Conditional expression 6]}$$

(where dS3 indicates the distance between the aperture diaphragm and a surface closest to the object side in the third lens group along the optical axis and R31 indicates the curvature radius of the surface closest to the object side in the third lens group).

Conditional expression 6 defines the shape of the surface closest to the object side in the third lens group.

The third lens group has a strong refractive power in order to converge the rays diverged by the second lens group. Therefore, the surface closest to the object side in the third lens group plays an important role in optimizing the shape of the third lens group and further improving the performance.

If the ratio is more than the upper limit of Conditional expression 6, it is difficult to effectively correct the negative spherical aberration occurring in the third lens group and improve the performance.

On the other hand, if the ratio is less than the lower limit of Conditional expression 6, it is difficult to reduce the overall length of the third lens group at the telephoto end.

Therefore, when the variable focal length lens system satisfies Conditional expression 6, it is possible to effectively correct the negative spherical aberration occurring in the third lens group and reduce the overall length of the third lens group at the telephoto end.

In order to further improve the performance, it is preferable that the variable focal length lens system according to the embodiment of the invention satisfy the following Conditional expression 7:

$$2 < f3/fw < 2.3 \qquad \text{[Conditional expression 7]}$$

(where f3 indicates the focal length of the third lens group).

Conditional expression 7 defines the focal length of the third lens group.

If the ratio is less than the lower limit of Conditional expression 7, it is difficult to effectively correct a variation in comatic aberration due to a change in the angle of view at the wide-angle end. As a result, it is difficult to obtain a sufficiently high performance.

On the other hand, if the ratio is more than the upper limit of Conditional expression 7, the overall length of a lens increases regardless of the position of the lens. Therefore, it is difficult to reduce the size of the lens.

Therefore, when the variable focal length lens system satisfies Conditional expression 7, it is possible to effectively correct a variation in comatic aberration at the wide-angle end and reduce the overall length of a lens regardless of the position of the lens.

In order to effectively correct a positive spherical aberration occurring in the second lens group and further improve the performance, it is preferable that the variable focal length lens system according to the embodiment of the invention satisfy the following Conditional expression 8:

$$-1 < 1/\beta 2t < -0.8 \qquad \text{[Conditional expression 8]}$$

(where $\beta 2t$ indicates the lateral magnification of the second lens group at the telephoto end).

Conditional expression 8 defines the lateral magnification of the second lens group.

If the ratio is more than the upper limit of Conditional expression 8, it is difficult to sufficiently correct a positive spherical aberration occurring in the second lens group. As a result, it is difficult to obtain a sufficiently high performance.

On the other hand, if the ratio is less than the lower limit of Conditional expression 8, it is difficult to sufficiently reduce the overall length of the second lens group at the telephoto end. As a result, it is difficult to sufficiently reduce the size of a lens.

Therefore, when the variable focal length lens system satisfies Conditional expression 8, it is possible to sufficiently correct the positive spherical aberration occurring in the second lens group and reduce the overall length of the second lens group at the telephoto end.

However, in the variable focal length lens system according to the embodiment of the invention, it is possible to shift an image by moving (shifting) one lens group or some lenses in one lens group among the first to fourth lens groups in a substantially vertical direction with respect to the optical axis. The variable focal length lens system may serve as an anti-shake optical system by moving one lens group or some lenses in one lens group in a substantially vertical direction with respect to the optical axis and combining a detecting system that detects image blur, a driving system that shifts each lens group, and a control system that gives the amount of shift to the driving system on the basis of the output of the detecting system.

In particular, in the variable focal length lens system according to the embodiment of the invention, the third lens group is shifted in a substantially vertical direction with respect to the optical axis. According to this structure, it is possible to reduce a variation in performance during the shift.

When the aperture diaphragm is arranged in the vicinity of the third lens group, the off-axis ray passes near the optical axis. Therefore, it is possible to prevent a variation in off-axis aberration occurring when the third lens group is shifted in a substantially vertical direction with respect to the optical axis.

However, in the variable focal length lens system according to the embodiment of the invention, it is possible to provide a low pass filter for preventing the generation of Moiré fringes on the image side of the lens system or an infrared cut filter according to the spectral sensitivity characteristics of a light-receiving element.

When the priority is given to an improvement in performance rather than a reduction in size, it is preferable that a third positive lens that has a positive refractive power and includes a convex surface facing the object side be provided on the image side of the second positive lens in the first lens group.

It is possible to improve the central performance by providing an aspheric lens in the third lens or the fourth lens group.

In addition, it is possible to ensure a high optical performance by forming a plurality of aspheric surfaces in the optical system of the variable focal length lens system.

NUMERICAL EXAMPLES

Next, exemplary embodiments of the variable focal length lens system according to the invention and numerical examples in which detailed numerical values are applied to the embodiments will be described with reference to the drawings and tables.

The meaning of the symbols in the following tables or description is as follows.

"f" indicates a focal length, "Fno" indicates the F number, "2ω" indicates an angle of view, "Di" indicates the surface spacing between an i-th surface and an (i+1)-th surface on the axis. Surface number "S" indicates an aperture diaphragm, and curvature radius "ASP" indicates an aspheric surface. "K" indicates a conic constant, "A", "B", "C", and "D" indicate 4th-order, 6th-order, 8th-order, and 10th-order aspheric coefficients, respectively, and "Bf" indicates a back focal length.

The refractive index is a value with respect to the d-line (λ=587.6 nm), and a curvature radius of "0.0000" indicates that the surface is flat.

The lenses used in each numerical example include an aspheric lens surface. When "x" indicates the distance from the top of the lens surface in the optical axis direction, "y" indicates a height (image height) in a direction vertical to the optical axis, "c" indicates a paraxial curvature (the reciprocal of a curvature radius) at the top of the lens, "K" indicates a conic constant, and "A", "B", ... respectively indicate 4th-order, 6th-order, ... aspheric coefficients, an aspheric shape is defined by the following Equation 1:

$$x = cy^2/[1+\{1-(1+\kappa)c^2y^2\}^{1/2}] + Ay^4 + By^6 + \ldots \quad \text{[Equation 1]}$$

FIG. 1 is a diagram illustrating the distribution of the refractive power of the variable focal length lens system according to each embodiment of the invention. Each embodiment includes a first lens group G1 with a positive refractive power, a second lens group G2 with a negative refractive power, a third lens group G3 with a positive refractive power, and a fourth lens group G4 with a positive refractive power arranged in this order from the object side to the image side.

In each embodiment, when the position of the lens is changed from the wide-angle end to the telephoto end, the gap between the first lens group G1 and the second lens group G2 increases and the gap between the second lens group G2 and the third lens group G3 decreases. Therefore, the gap between the third lens group G3 and the fourth lens group G4 is changed.

When the position of the lens is changed from the wide-angle end to the telephoto end, all of the lens groups G1, G2, G3, and G4 are moved. The aperture diaphragm S is arranged in the vicinity of the object side of the third lens group G3. The fourth lens group G4 is moved so as to correct a variation in the position of the image surface due to the movement of the lens groups G1, G2, G3, and G4 and is moved to the object side during close-distance focusing.

First Embodiment

Figure 2:
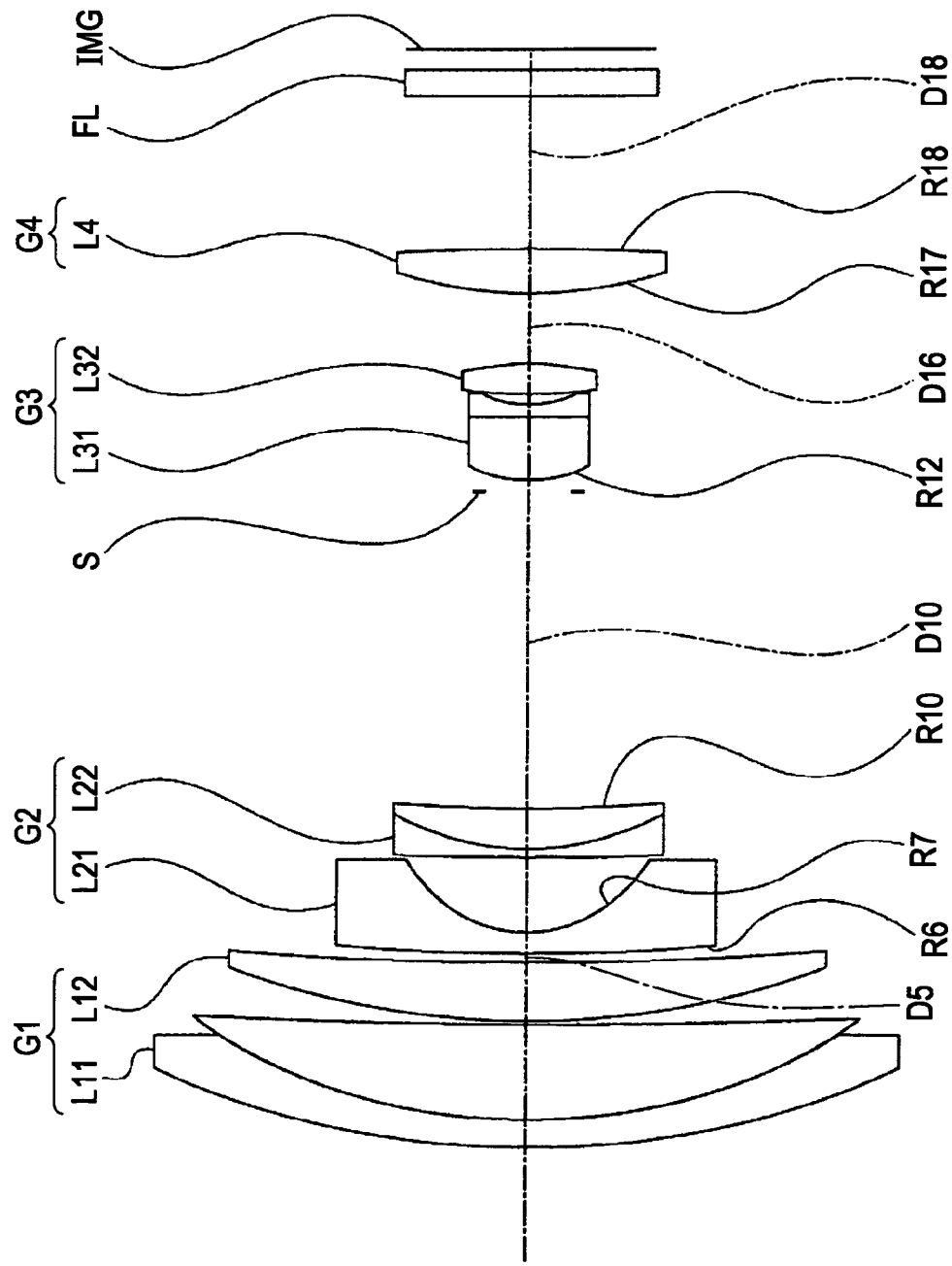
FIG. 2 is a diagram illustrating the lens structure of a variable focal length lens system according to a first embodiment of the invention.

FIG. 2 is a diagram illustrating the lens structure of a variable focal length lens system 1 according to a first embodiment of the invention. The variable focal length lens system 1 includes 10 lenses.

A first lens group G1 includes a cemented lens L11 of a meniscus-shaped negative lens having a convex surface facing the object side and a first positive lens having a convex surface facing the object side and a meniscus-shaped second positive lens L12 having a convex surface facing the object side.

A second lens group G2 includes a meniscus-shaped first negative lens L21 having a concave surface facing the image side and a cemented lens L22 of a second negative lens having a concave surface facing the image side and a positive lens having a convex surface facing the object side.

A third lens group G3 includes a cemented lens L31 of a first positive lens having a convex surface facing the object side and a negative lens having a concave surface facing the image side and a second positive lens L32 having a biconvex shape.

A fourth lens group G4 includes a positive lens L4 having a biconvex shape.

A filter FL is provided between the fourth lens group G4 and an image surface IMG.

Table 1 shows lens data of Numerical example 1 in which detailed numerical values are applied to the variable focal length lens system 1 according to the first embodiment.

TABLE 1

| f | 1.00~2.10~9.42 |
|---|---|
| Fno | 3.58~4.38~5.79 |
| 2ω | 87.12~41.94~9.62 |

| SURFACE NUMBER | CURVATURE RADIUS | SURFACE SPACING | REFRACTIVE INDEX | ABBE NUMBER |
|---|---|---|---|---|
| 1 | 6.5315 | 0.226 | 1.84666 | 23.83 |
| 2 | 4.5115 | 0.740 | 1.49700 | 81.60 |
| 3 | 32.5526 | 0.034 | | |
| 4 | 6.0493 | 0.456 | 1.75500 | 52.30 |
| 5 | 23.2039 | (D5) | | |
| 6 | 9.6836 (ASP) | 0.180 | 1.85135 | 40.10 |
| 7 | 1.0206 (ASP) | 0.557 | | |
| 8 | 38.3310 | 0.079 | 1.61800 | 63.39 |
| 9 | 1.9169 | 0.332 | 2.00178 | 19.32 |
| 10 | 5.0807 (ASP) | (D10) | | |
| 11(S) | 0.0000 | 0.090 | | |
| 12 | 1.0195 (ASP) | 0.521 | 1.74330 | 49.22 |
| 13 | 0.0000 | 0.090 | 1.76182 | 26.61 |
| 14 | 0.9781 | 0.072 | | |
| 15 | 3.4011 | 0.239 | 1.56384 | 60.83 |
| 16 | −1.9726 | (D16) | | |
| 17 | 3.1029 (ASP) | 0.365 | 1.55332 | 71.67 |
| 18 | −225.5158 (ASP) | (D18) | | |
| 19 | 0.0000 | 0.210 | 1.51680 | 64.20 |
| 20 | 0.0000 | (Bf) | | |

In the variable focal length lens system 1, aspheric surfaces are an object-side surface (R6) of the first negative lens L21 in the second lens group G2, an image-side surface (R7) of the first negative lens L21 in the second lens group G2, a surface (R10) of the cemented lens L22 that is closest to the image side in the second lens group G2, a surface (R12) of the cemented lens L31 that is closest to the object side in the third lens group G3, an object-side surface (R17) of the positive lens L4 in the fourth lens group G4, and an image-side surface (R18) of the positive lens L4 in the fourth lens group G4. Table 2 shows the conic constants K and the 4th-order, 6th-order, 8th-order, and 10th-order aspheric coefficients A, B, C, and D of the aspheric surfaces in Numerical example 1.

In Table 2 and the following tables showing the aspheric coefficients, "E-i" indicates an exponent having 10 as the base, that is, "$10^{-i}$". For example, "0.12345E−05" indicates "$0.12345 \times 10^{-5}$".

TABLE 2

| | | | | | |
|---|---|---|---|---|---|
| SIXTH SURFACE | K = 0.0000 | A = 0.135472E−01 | B = −0.364466E−01 | C = 0.151641E−01 | D = −0.220023E−02 |
| SEVENTH SURFACE | K = −0.8858 | A = 0.138540E+00 | B = 0.559594E−01 | C = −0.175884E−01 | D = −0.535794E−01 |
| TENTH SURFACE | K = 0.0000 | A = −0.449927E−01 | B = −0.653602E−02 | C = −0.344701E−02 | D = 0.155780E−01 |
| TWELFTH SURFACE | K = −0.5974 | A = −0.892823E−02 | B = 0.930879E−01 | C = −0.381389E+00 | D = 0.777461E+00 |
| SEVENTEENTH SURFACE | K = 6.5825 | A = −0.270797E−01 | B = −0.254666E−01 | C = 0.113320E−01 | D = −0.238724E−01 |
| EIGHTEENTH SURFACE | K = 0.0000 | A = 0.913264E−03 | B = −0.213113E−01 | C = 0.000000E+00 | D = 0.000000E+00 |

In the variable focal length lens system 1, when power varies between the wide-angle end and the telephoto end, a surface spacing D5 between the first lens group G1 and the second lens group G2, a surface spacing D10 between the second lens group G2 and the aperture diaphragm S, a surface spacing D16 between the third lens group G3 and the fourth lens group G4, and a surface spacing D18 between the fourth lens group G4 and the filter FL vary. Table 3 shows the F number Fno, the angle 2ω of view, and the variable surface spacings at the wide-angle end (focal length f=1.000), an intermediate focal length (focal length f=2.101), and the telephoto end (focal length f=9.420) in Numerical example 1.

TABLE 3

| f | 1.000 | 2.101 | 9.420 |
|---|---|---|---|
| D5 | 0.079 | 1.394 | 4.346 |
| D10 | 2.499 | 1.180 | 0.056 |
| D16 | 0.541 | 1.006 | 3.103 |
| D18 | 1.189 | 1.508 | 0.528 |
| Bf | 0.182 | 0.182 | 0.182 |

Figure 3:
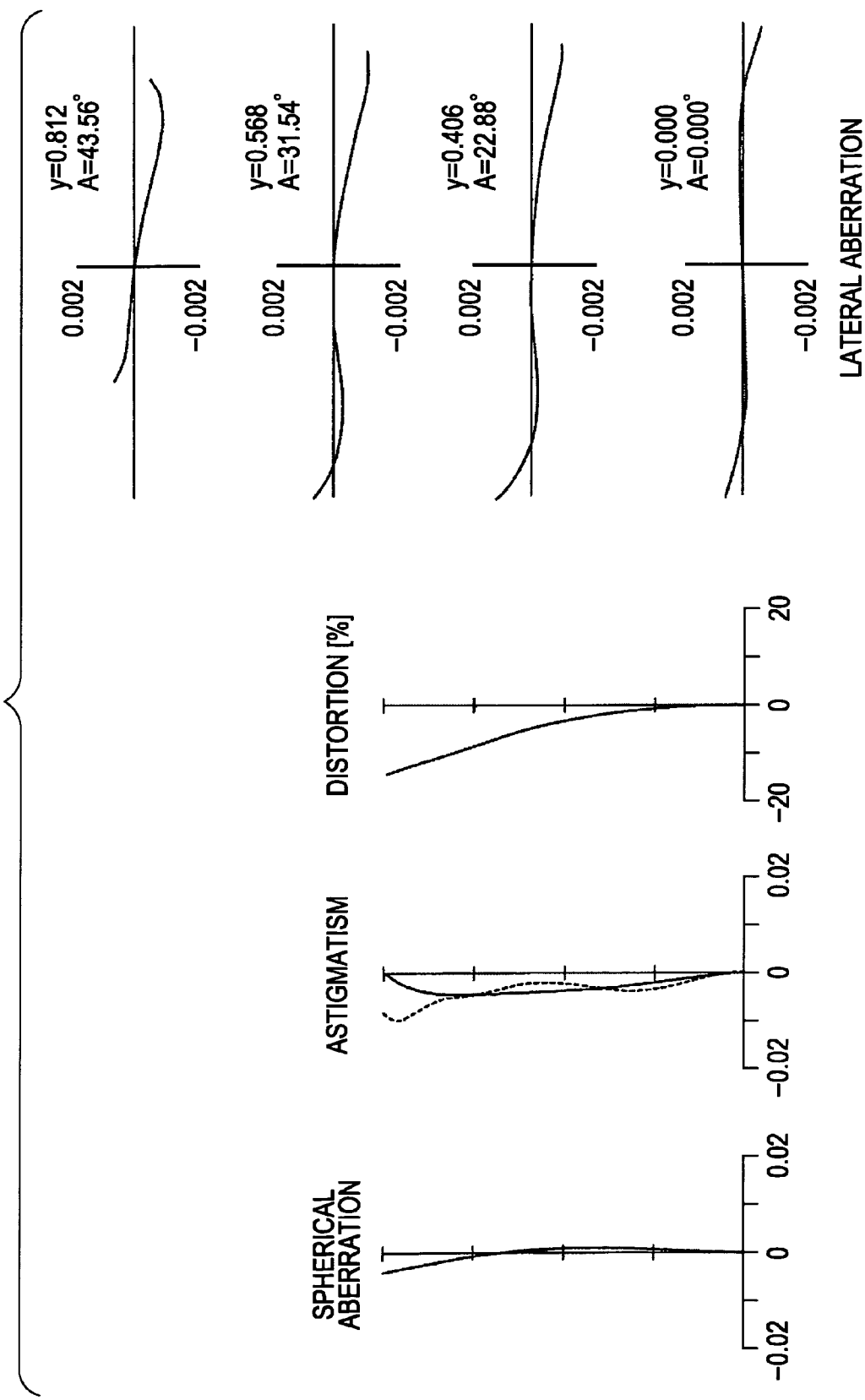
FIG. 3 is an aberration diagram illustrating a numerical example in which detailed numerical values are applied to the first embodiment together with FIGS. 4 and 5, and shows spherical aberration, astigmatism, distortion, and lateral aberration at a wide-angle end.
Figure 4:
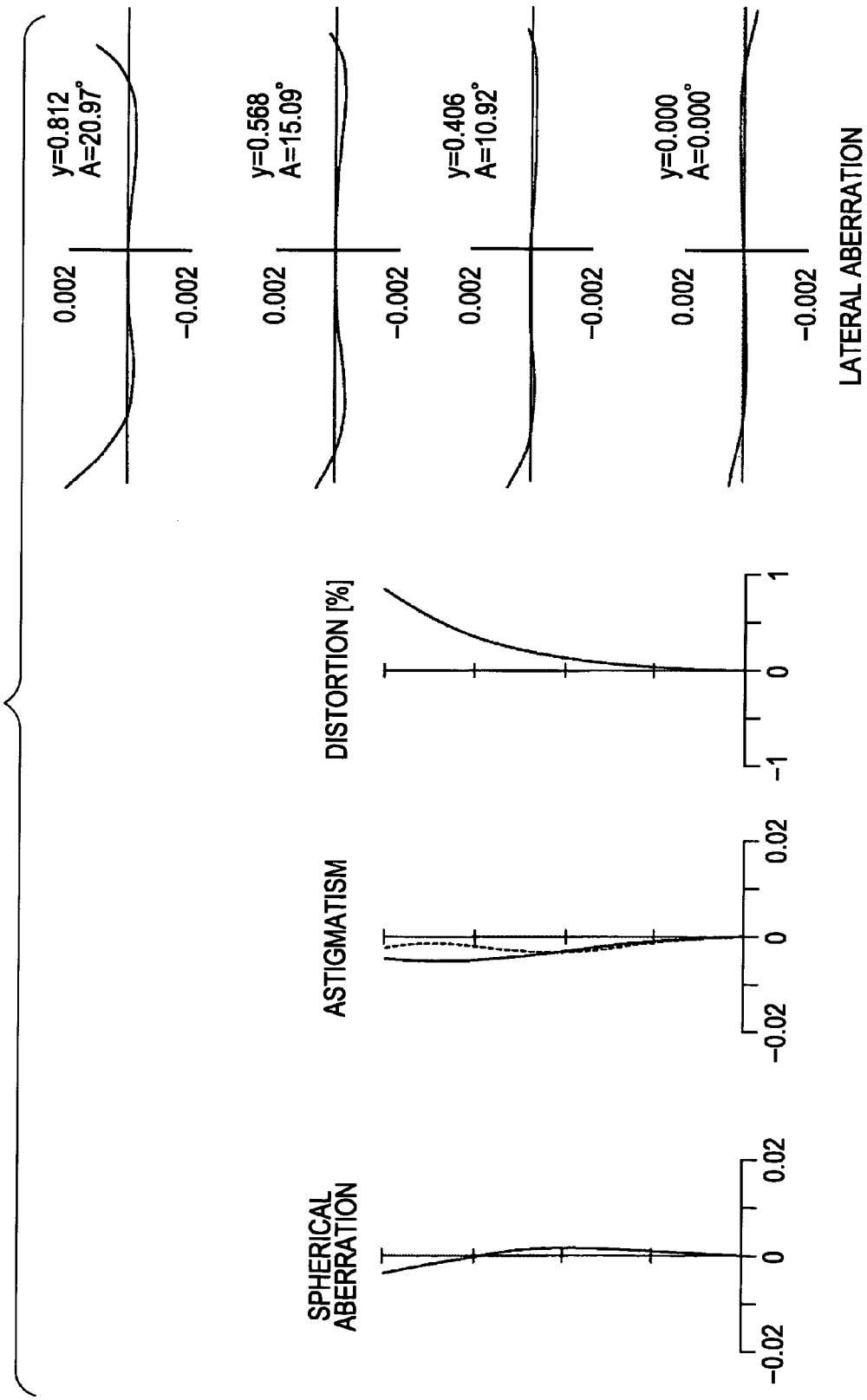
FIG. 4 is a diagram illustrating spherical aberration, astigmatism, distortion, and lateral aberration at an intermediate focal length.
Figure 5:
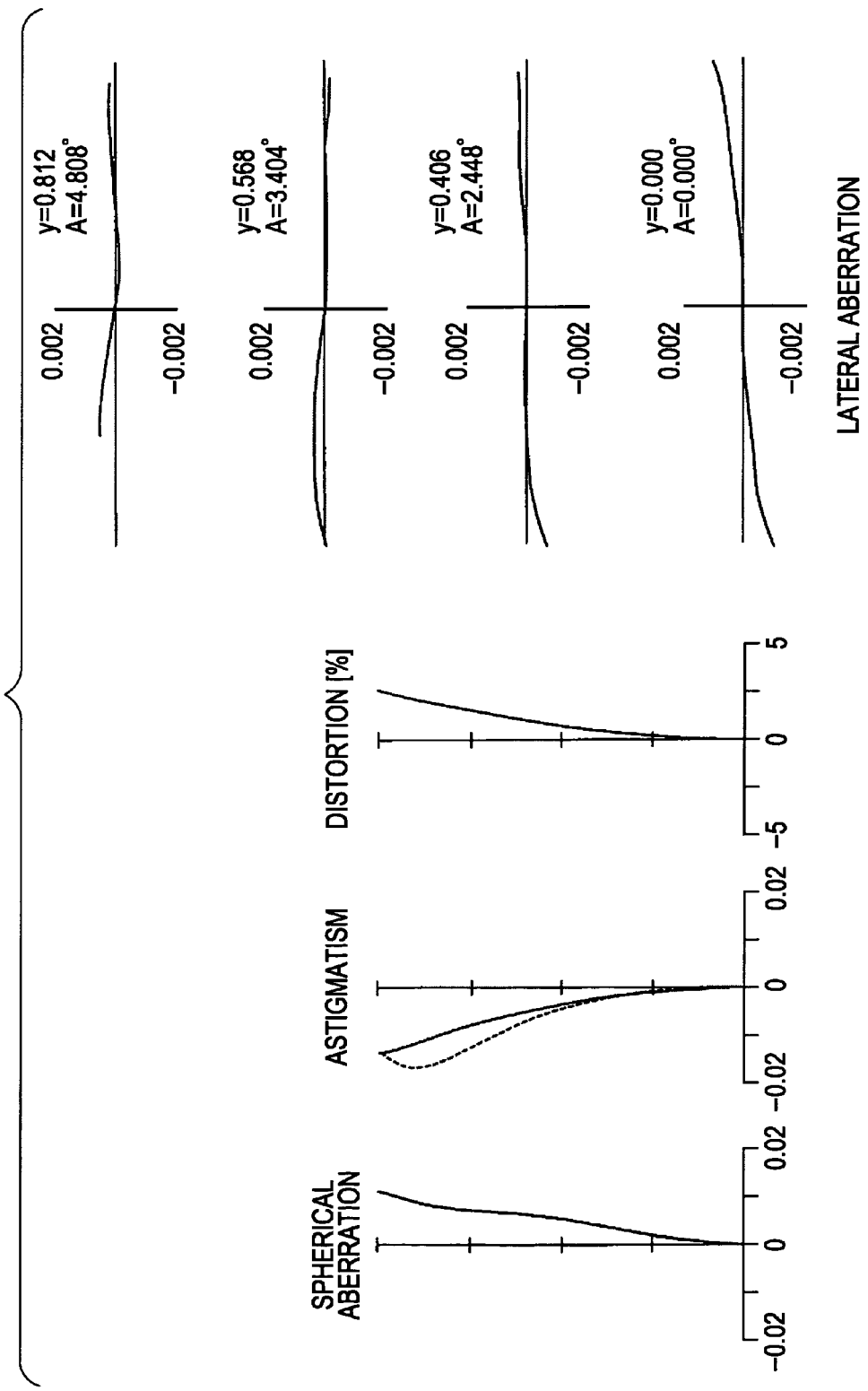
FIG. 5 is a diagram illustrating spherical aberration, astigmatism, distortion, and lateral aberration at a telephoto end.

FIGS. 3 to 5 show all aberrations in an infinity focus state in Numerical example 1. FIG. 3 shows all aberrations at the wide-angle end (focal length f=1.000), FIG. 4 shows all aberrations at an intermediate focal length (focal length f=2.101), and FIG. 5 shows all aberrations at the telephoto end (focal length f=9.420).

In the astigmatism diagrams shown in FIGS. 3 to 5, a solid line indicates a value on a sagittal image surface and a dashed line indicates a meridional image surface. In the lateral aberration diagrams, "y" indicates an image height and "A" indicates a half angle of view.

As can be seen from each aberration diagram, in Numerical example 1, all aberrations are effectively corrected and a high imaging performance is obtained.

Second Embodiment

Figure 6:
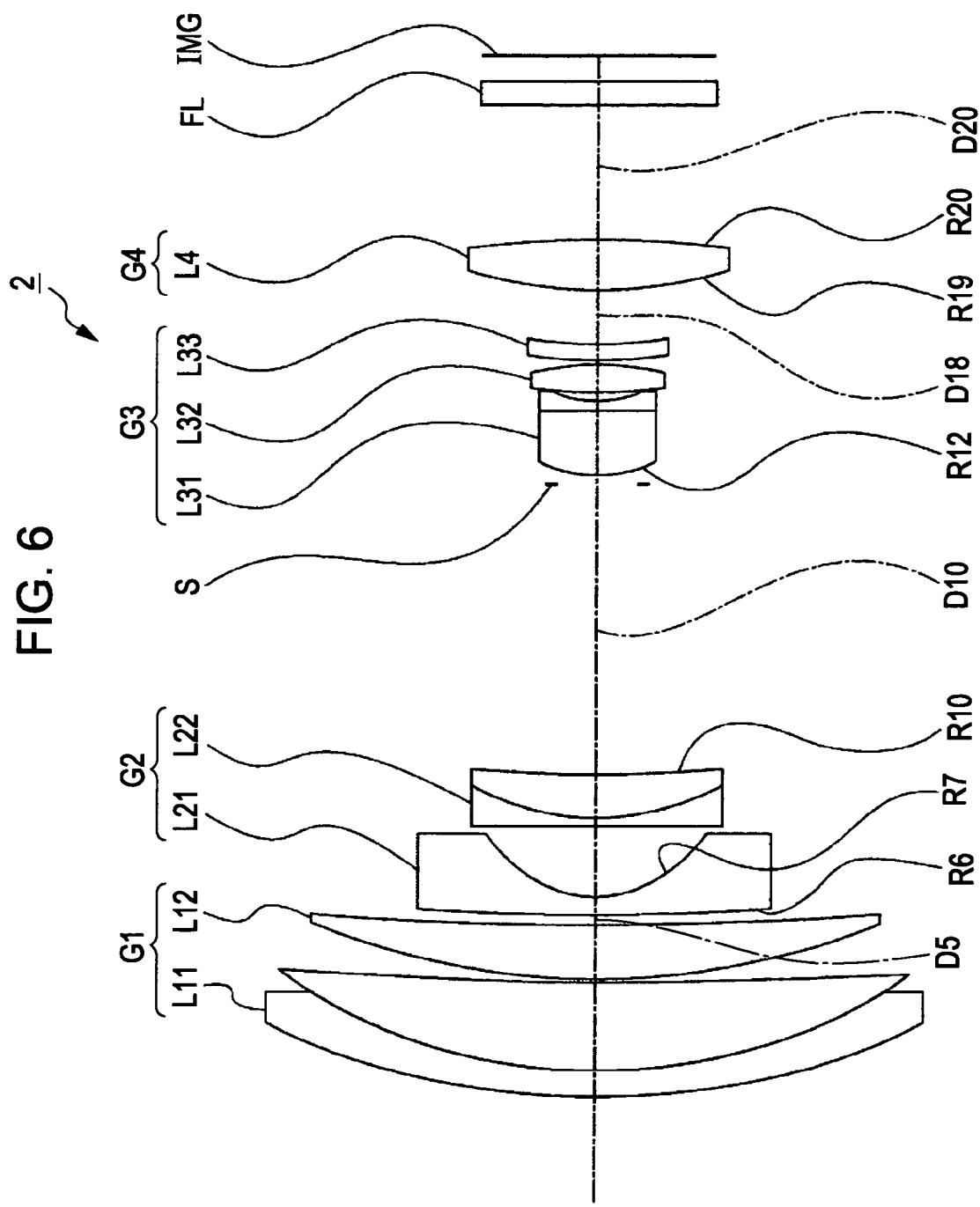
FIG. 6 is a diagram illustrating the lens structure of a variable focal length lens system according to a second embodiment of the invention.

FIG. 6 is a diagram illustrating the lens structure of a variable focal length lens system 2 according to a second embodiment of the invention. The variable focal length lens system 2 includes 11 lenses.

A first lens group G1 includes a cemented lens L11 of a meniscus-shaped negative lens having a convex surface facing the object side and a first positive lens having a convex surface facing the object side and a meniscus-shaped second positive lens L12 having a convex surface facing the object side.

A second lens group G2 includes a meniscus-shaped first negative lens L21 having a concave surface facing the image side and a cemented lens L22 of a second negative lens having a concave surface facing the image side and a positive lens having a convex surface facing the object side.

A third lens group G3 includes a cemented lens L31 of a first positive lens having a convex surface facing the object side and a first negative lens having a concave surface facing the image side, a second positive lens L32 having a biconvex shape, and a meniscus-shaped second negative lens L33 having a concave surface facing the image side.

A fourth lens group G4 includes a positive lens L4 having a biconvex shape.

A filter FL is provided between the fourth lens group G4 and an image surface IMG.

Table 4 shows lens data of Numerical example 2 in which detailed numerical values are applied to the variable focal length lens system 2 according to the second embodiment.

TABLE 4

| | | | | |
|---|---|---|---|---|
| f | | 1.00~2.10~9.42 | | |
| Fno | | 3.59~4.33~5.97 | | |
| 2ω | | 87.27~41.87~9.62 | | |
| SURFACE NUMBER | CURVATURE RADIUS | SURFACE SPACING | REFRAC- TIVE INDEX | ABBE NUM- BER |
| 1 | 6.2084 | 0.226 | 1.84666 | 23.83 |
| 2 | 4.3267 | 0.733 | 1.49700 | 81.60 |
| 3 | 25.4380 | 0.034 | | |
| 4 | 5.7269 | 0.442 | 1.75500 | 52.30 |
| 5 | 21.4439 | (D5) | | |
| 6 | 7.6866 (ASP) | 0.169 | 1.85135 | 40.10 |
| 7 | 0.9830 (ASP) | 0.559 | | |
| 8 | 53.4131 | 0.090 | 1.61800 | 63.39 |
| 9 | 1.9169 | 0.329 | 2.00178 | 19.32 |
| 10 | 5.1634 (ASP) | (D10) | | |
| 11(S) | 0.0000 | 0.090 | | |
| 12 | 1.0483 (ASP) | 0.516 | 1.72916 | 54.67 |
| 13 | 0.0000 | 0.090 | 1.74077 | 27.79 |
| 14 | 1.0270 | 0.072 | | |
| 15 | 3.5427 | 0.246 | 1.62230 | 53.17 |
| 16 | −1.9865 | 0.045 | | |
| 17 | 3.3349 | 0.113 | 2.00069 | 25.46 |
| 18 | 2.7063 | (D18) | | |
| 19 | 2.9898 (ASP) | 0.388 | 1.55332 | 71.67 |
| 20 | −35.3735 (ASP) | (D20) | | |
| 21 | 0.0000 | 0.210 | 1.51680 | 64.20 |
| 22 | 0.0000 | (Bf) | | |

In the variable focal length lens system 2, aspheric surfaces are an object-side surface (R6) of the first negative lens L21 in the second lens group G2, an image-side surface (R7) of the first negative lens L21 in the second lens group G2, a surface (R10) of the cemented lens L22 that is closest to the image side in the second lens group G2, a surface (R12) of the cemented lens L31 that is closest to the object side in the third lens group G3, an object-side surface (R19) of the positive lens L4 in the fourth lens group G4, and an image-side surface (R20) of the positive lens L4 in the fourth lens group G4. Table 5 shows the conic constants K and the 4th-order, 6th-order, 8th-order, and 10th-order aspheric coefficients A, B, C, and D of the aspheric surfaces in Numerical example 2.

TABLE 5

| | | | | | |
|---|---|---|---|---|---|
| SIXTH SURFACE | K = 0.000 | A = 0.643422E−02 | B = −0.381740E−01 | C = 0.171570E−01 | D = −0.257027E−02 |
| SEVENTH SURFACE | K = −0.779 | A = 0.124018E+00 | B = 0.628815E−01 | C = −0.623442E−01 | D = −0.255596E−01 |
| TENTH SURFACE | K = 0.000 | A = −0.467697E−01 | B = −0.281891E−02 | C = −0.771228E−02 | D = 0.168504E−01 |
| TWELFTH SURFACE | K = −0.639 | A = −0.147816E−01 | B = 0.111592E+00 | C = −0.576185E+00 | D = 0.148701E+01 |
| NINETEENTH SURFACE | K = 0.260 | A = 0.601579E−03 | B = −0.740241E−02 | C = −0.914795E−02 | D = 0.401309E−03 |
| TWENTIETH SURFACE | K = 0.000 | A = 0.610006E−02 | B = −0.282328E−01 | C = 0.000000E+00 | D = 0.000000E+00 |

In the variable focal length lens system 2, when power varies between the wide-angle end and the telephoto end, a surface spacing D5 between the first lens group G1 and the second lens group G2, a surface spacing D10 between the second lens group G2 and the aperture diaphragm S, a surface spacing D18 between the third lens group G3 and the fourth lens group G4, and a surface spacing D20 between the fourth lens group G4 and the filter FL vary. Table 6 shows the F number Fno, the angle 2ω of view, and the variable surface spacings at the wide-angle end (focal length f=1.000), an intermediate focal length (focal length f=2.101), and the telephoto end (focal length f=9.418) in Numerical example 2.

TABLE 6

| f | 1.000 | 2.101 | 9.418 |
|---|---|---|---|
| D5 | 0.079 | 1.378 | 4.164 |
| D10 | 2.439 | 1.120 | 0.056 |
| D16 | 0.451 | 0.790 | 3.120 |
| D18 | 1.149 | 1.536 | 0.530 |
| Bf | 0.182 | 0.182 | 0.182 |

Figure 7:
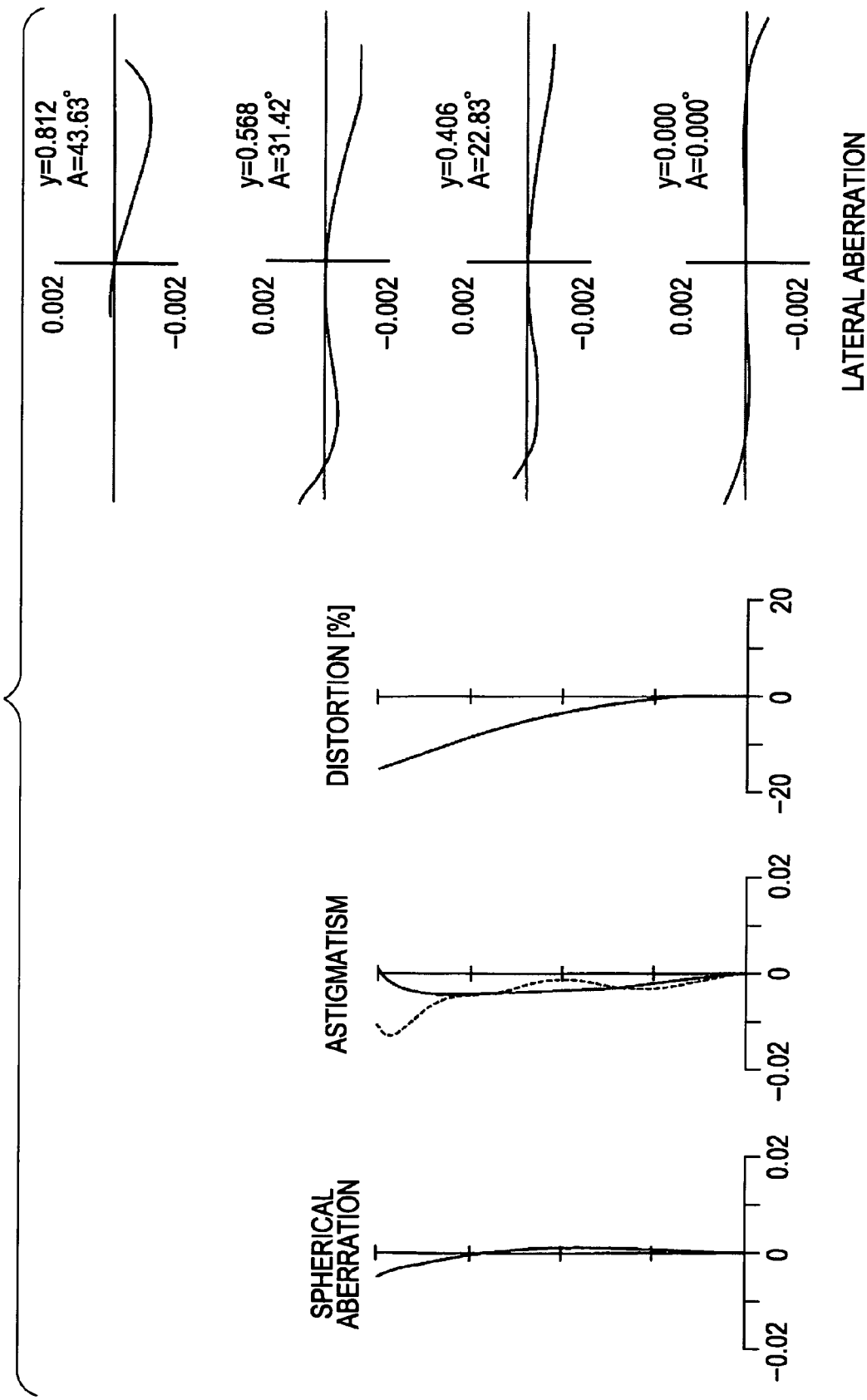
FIG. 7 is an aberration diagram illustrating a numerical example in which detailed numerical values are applied to the second embodiment together with FIGS. 8 and 9, and shows spherical aberration, astigmatism, distortion, and lateral aberration at a wide-angle end.
Figure 8:
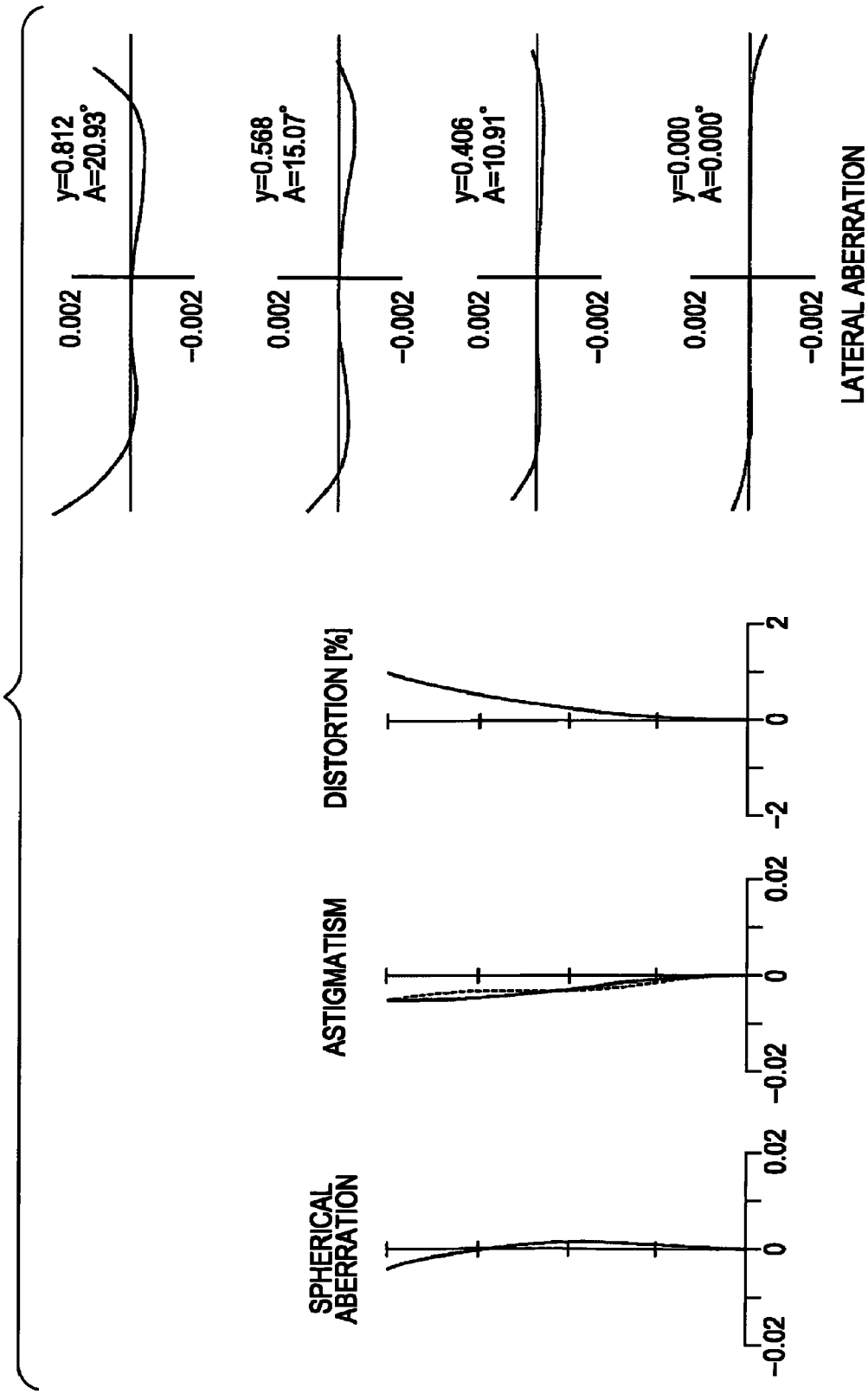
FIG. 8 is a diagram illustrating spherical aberration, astigmatism, distortion, and lateral aberration at an intermediate focal length.
Figure 9:
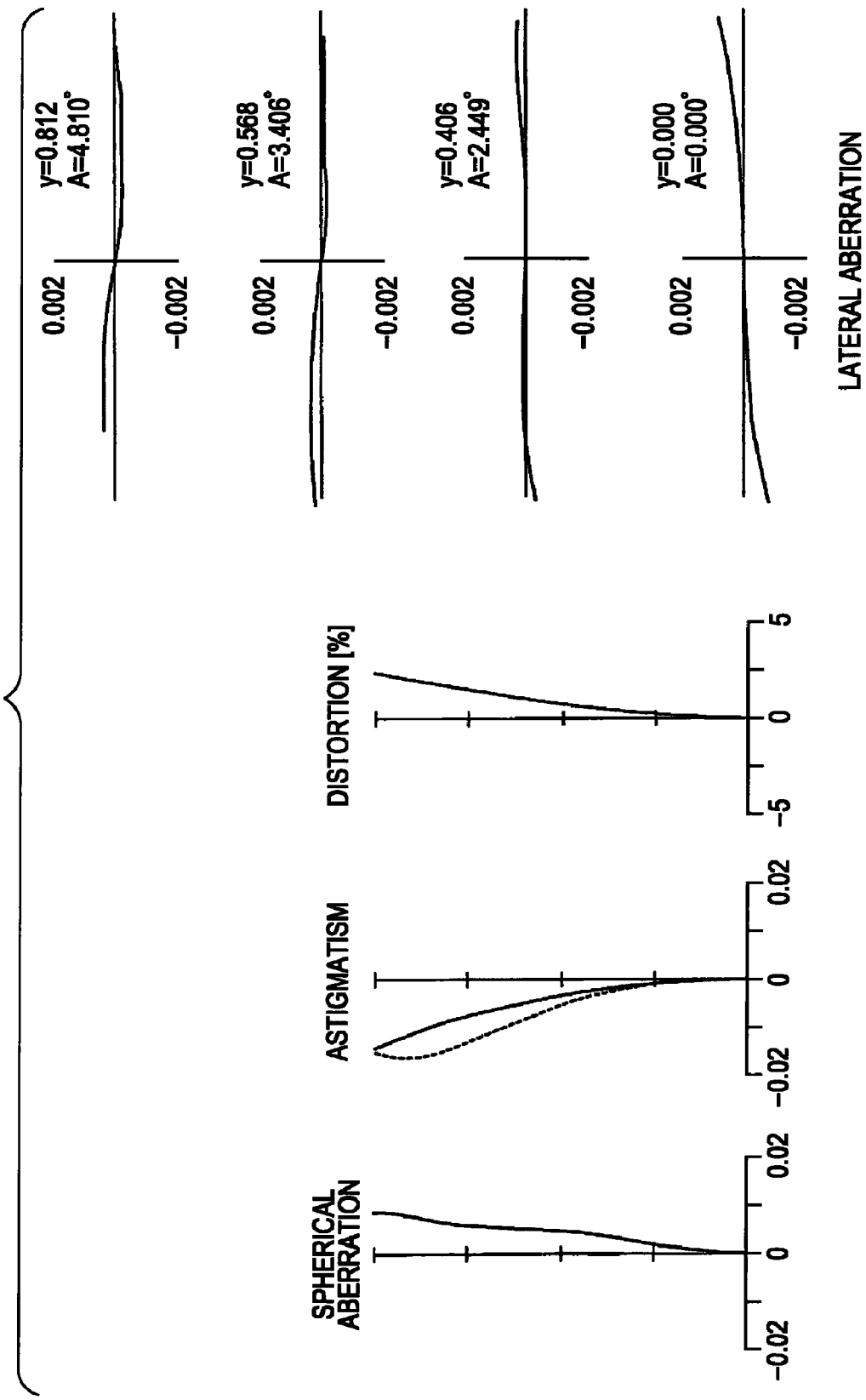
FIG. 9 is a diagram illustrating spherical aberration, astigmatism, distortion, and lateral aberration at a telephoto end.

FIGS. 7 to 9 show all aberrations in an infinity focus state in Numerical example 2. FIG. 7 shows all aberrations at the wide-angle end (focal length f=1.000), FIG. 8 shows all aberrations at an intermediate focal length (focal length f=2.101), and FIG. 9 shows all aberrations at the telephoto end (focal length f=9.418).

In the astigmatism diagrams shown in FIGS. 7 to 9, a solid line indicates a value on a sagittal image surface and a dashed line indicates a meridional image surface. In the lateral aberration diagrams, "y" indicates an image height and "A" indicates a half angle of view.

As can be seen from each aberration diagram, in Numerical example 2, all aberrations are effectively corrected and a high imaging performance is obtained.

Third Embodiment

Figure 10:
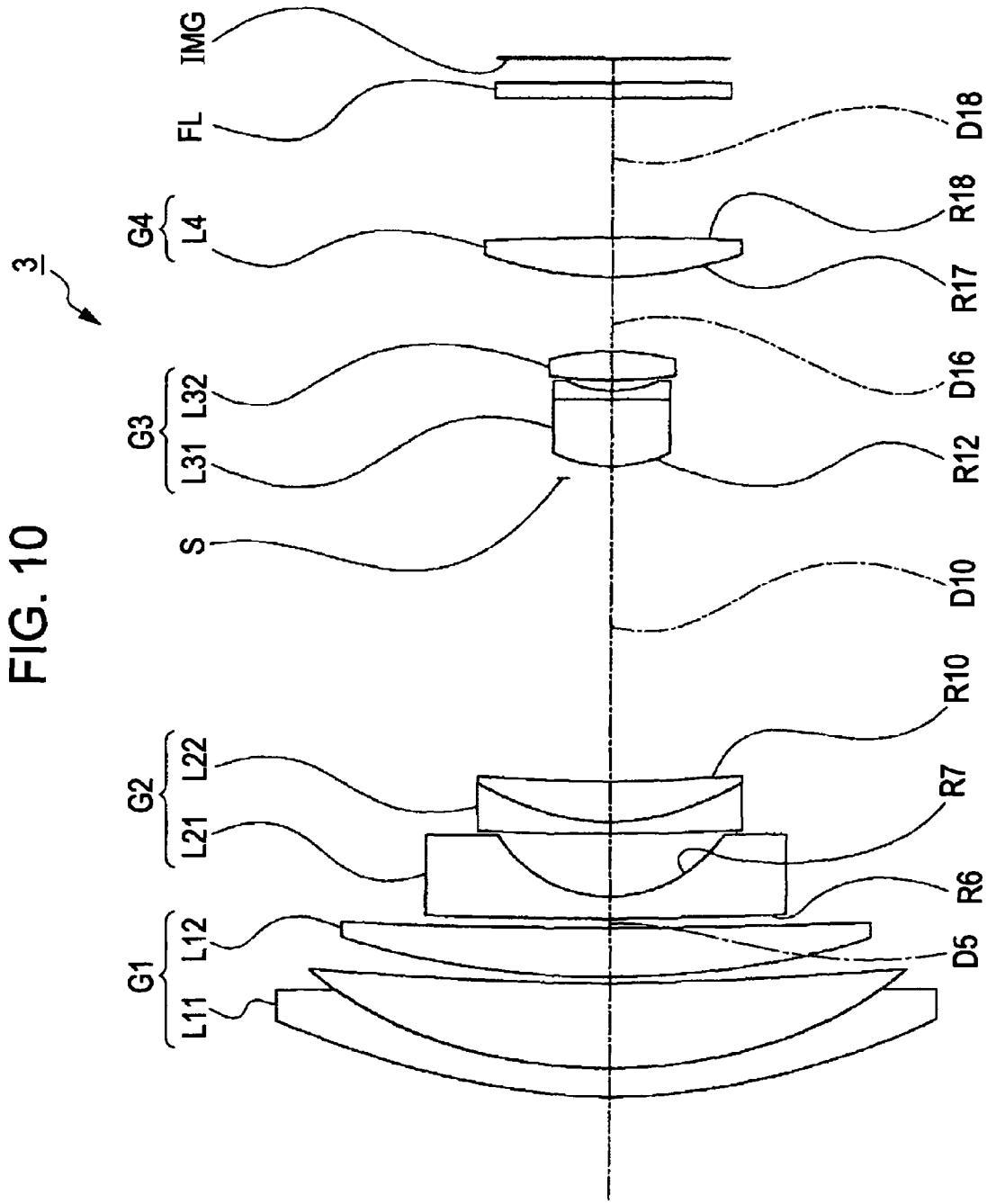
FIG. 10 is a diagram illustrating the lens structure of a variable focal length lens system according to a third embodiment of the invention.

FIG. 10 is a diagram illustrating the lens structure of a variable focal length lens system 3 according to a third embodiment of the invention. The variable focal length lens system 3 includes 10 lenses.

A first lens group G1 includes a cemented lens L11 of a meniscus-shaped negative lens having a convex surface facing the object side and a first positive lens having a convex surface facing the object side, and a meniscus-shaped second positive lens L12 having a convex surface facing the object side.

A second lens group G2 includes a meniscus-shaped first negative lens L21 having a concave surface facing the image side and a cemented lens L22 of a second negative lens having a concave surface facing the image side and a positive lens having a convex surface facing the object side.

A third lens group G3 includes a cemented lens L31 of a first positive lens having a convex surface facing the object side and a negative lens having a concave surface facing the image side and a second positive lens L32 having a biconvex shape.

A fourth lens group G4 includes a positive lens L4 having a biconvex shape.

A filter FL is provided between the fourth lens group G4 and an image surface IMG.

Table 7 shows lens data of Numerical example 3 in which detailed numerical values are applied to the variable focal length lens system 3 according to the third embodiment.

TABLE 7

| f | 1.00~2.10~9.41 |
|---|---|
| Fno | 3.56~4.37~5.75 |
| 2ω | 87.19~42.28~9.62 |

| SURFACE NUMBER | CURVATURE RADIUS | SURFACE SPACING | REFRACTIVE INDEX | ABBE NUMBER |
|---|---|---|---|---|
| 1 | 5.9308 | 0.214 | 1.84666 | 23.83 |
| 2 | 4.0138 | 0.715 | 1.49700 | 81.60 |
| 3 | 17.0965 | 0.045 | | |
| 4 | 6.2807 | 0.451 | 1.80420 | 46.50 |
| 5 | 32.8475 | (D5) | | |
| 6 | 30.4916 (ASP) | 0.180 | 1.85135 | 40.10 |
| 7 | 1.1005 (ASP) | 0.557 | | |
| 8 | 22.5561 | 0.079 | 1.61800 | 63.39 |
| 9 | 1.9173 | 0.341 | 2.00178 | 19.32 |
| 10 | 5.1425 (ASP) | (D10) | | |
| 11(S) | 0.0000 | 0.079 | | |
| 12 | 1.0684 (ASP) | 0.573 | 1.74330 | 49.22 |
| 13 | −600.8425 | 0.090 | 1.76182 | 26.61 |
| 14 | 1.0150 | 0.065 | | |
| 15 | 3.4374 | 0.232 | 1.60300 | 65.44 |
| 16 | −2.2049 | (D16) | | |
| 17 | 2.9276 (ASP) | 0.352 | 1.55332 | 71.67 |
| 18 | −225.5608 (ASP) | (D18) | | |
| 19 | 0.0000 | 0.113 | 1.51680 | 64.20 |
| 20 | 0.0000 | (Bf) | | |

In the variable focal length lens system 3, aspheric surfaces are an object-side surface (R6) of the first negative lens L21 in the second lens group G2, an image-side surface (R7) of the first negative lens L21 in the second lens group G2, a surface (R10) of the cemented lens L22 that is closest to the image side in the second lens group G2, a surface (R12) of the cemented lens L31 that is closest to the object side in the third lens group G3, an object-side surface (R17) of the positive lens L4 in the fourth lens group G4, and an image-side surface (R18) of the positive lens L4 in the fourth lens group G4. Table 8 shows the conic constants K and the 4th-order, 6th-order, 8th-order, and 10th-order aspheric coefficients A, B, C, and D of the aspheric surfaces in Numerical example 3.

TABLE 8

| | | | | | |
|---|---|---|---|---|---|
| SIXTH SURFACE | K = 0.0000 | A = 0.388214E−01 | B = −0.391802E−01 | C = 0.116370E−01 | D = −0.113549E−02 |
| SEVENTH SURFACE | K = −0.0305 | A = 0.700246E−01 | B = −0.204887E−03 | C = 0.630714E−01 | D = −0.152838E+00 |
| TENTH SURFACE | K = 0.0000 | A = −0.377150E−01 | B = −0.135623E−01 | C = −0.992929E−03 | D = 0.181002E−01 |
| TWELFTH SURFACE | K = −0.5957 | A = −0.892154E−02 | B = 0.170812E+00 | C = −0.123781E+01 | D = 0.341403E−01 |
| SEVENTEENTH SURFACE | K = −10.0000 | A = 0.321400E−01 | B = 0.953177E−02 | C = −0.259503E−01 | D = 0.127175E−01 |
| EIGHTEENTH SURFACE | K = 0.0000 | A = −0.150195E−01 | B = −0.262525E−02 | C = 0.000000E+00 | D = 0.000000E+00 |

In the variable focal length lens system 3, when power varies between the wide-angle end and the telephoto end, a surface spacing D5 between the first lens group G1 and the second lens group G2, a surface spacing D10 between the second lens group G2 and the aperture diaphragm S, a surface spacing D16 between the third lens group G3 and the fourth lens group G4, and a surface spacing D18 between the fourth lens group G4 and the filter FL vary. Table 9 shows the F number Fno, the angle 2ω of view, and the variable surface spacings at the wide-angle end (focal length f=1.000), an intermediate focal length (focal length f=2.101), and the telephoto end (focal length f=9.414) in Numerical example 3.

TABLE 9

| f | 1.000 | 2.101 | 9.414 |
|---|---|---|---|
| D5 | 0.079 | 1.331 | 4.290 |
| D10 | 2.599 | 1.248 | 0.056 |
| D16 | 0.637 | 1.282 | 3.213 |
| D18 | 1.156 | 1.394 | 0.533 |
| Bf | 0.228 | 0.228 | 0.228 |

Figure 11:
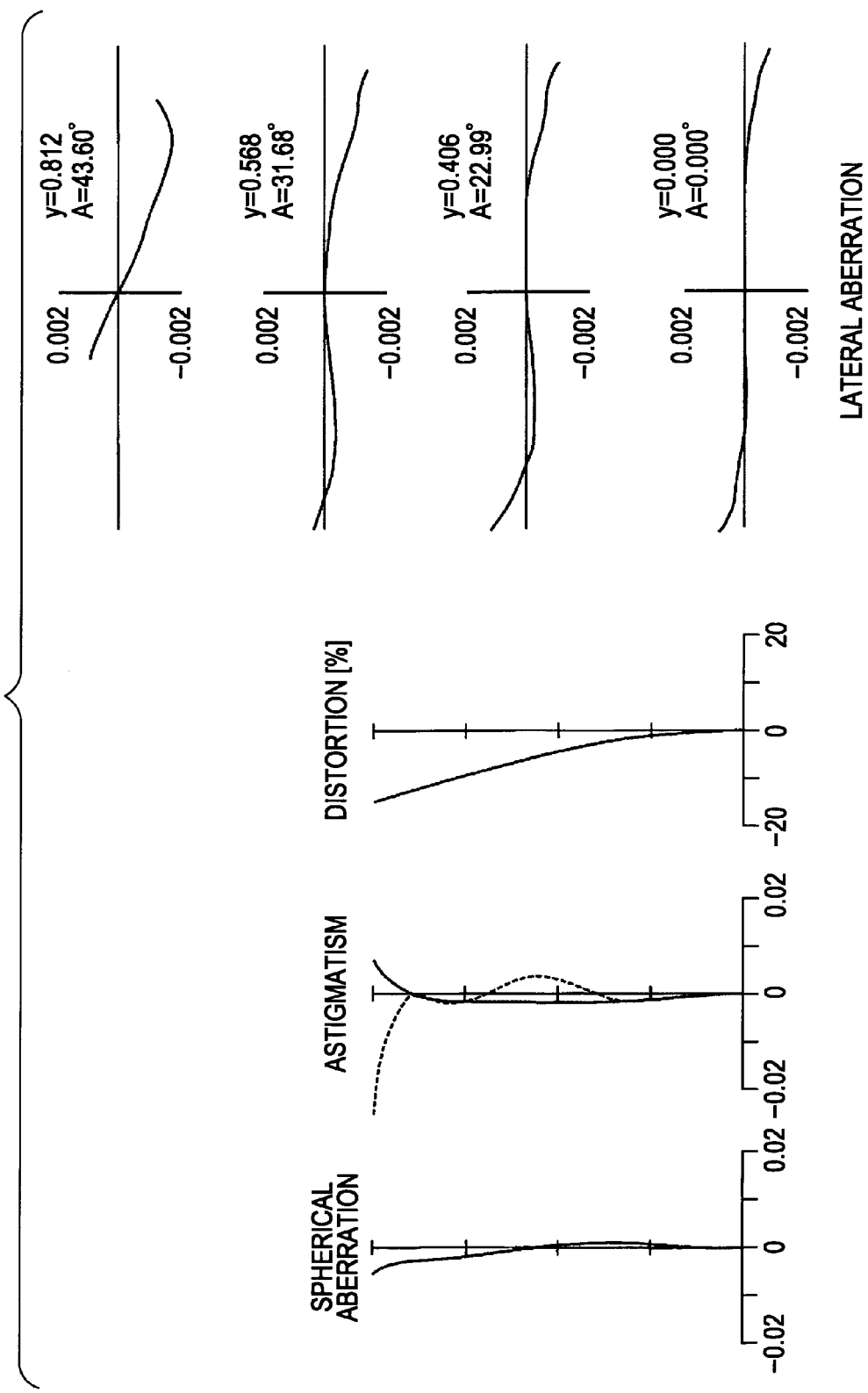
FIG. 11 is an aberration diagram illustrating a numerical example in which detailed numerical values are applied to the third embodiment together with FIGS. 12 and 13, and shows spherical aberration, astigmatism, distortion, and lateral aberration at a wide-angle end.
Figure 12:
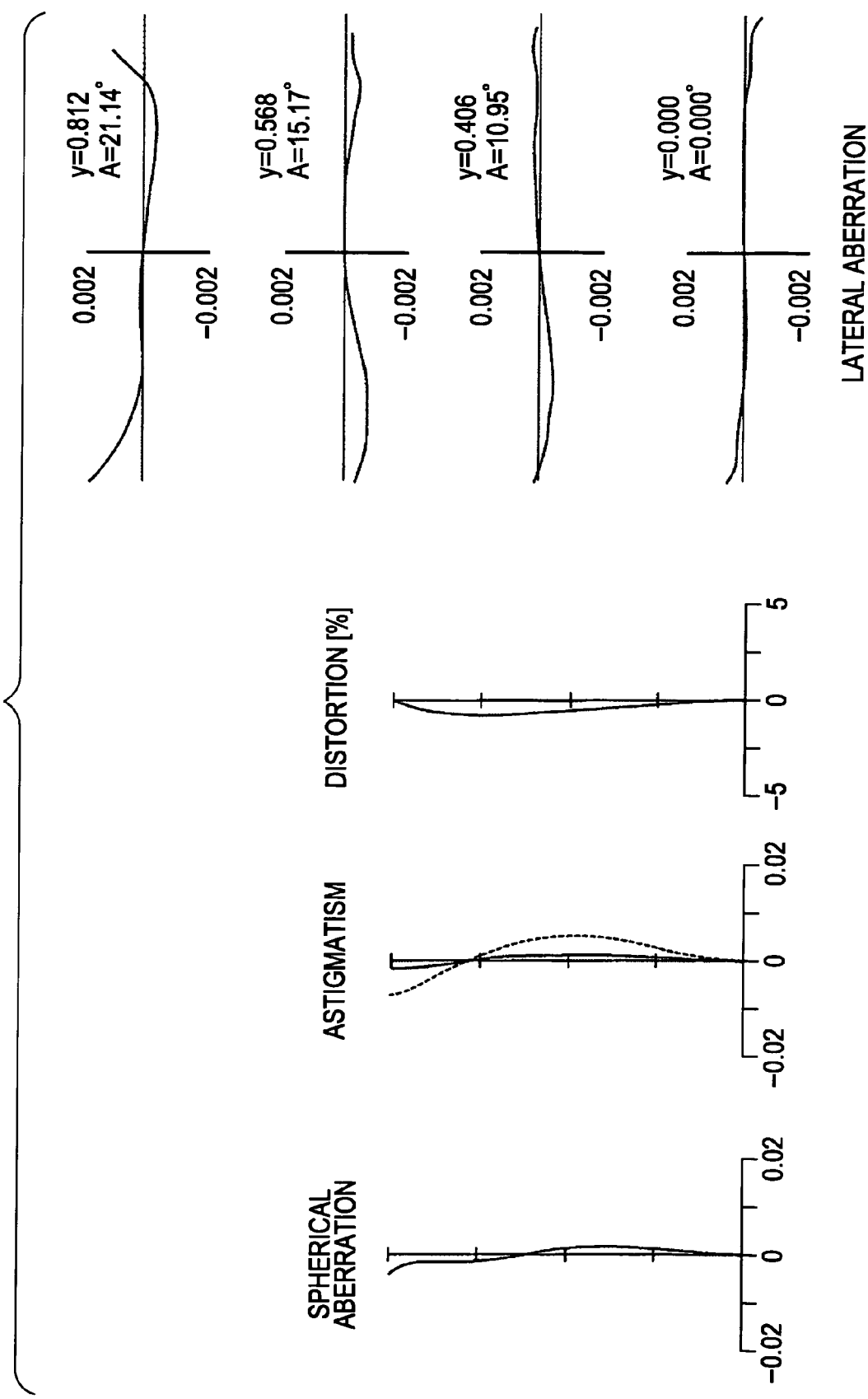
FIG. 12 is a diagram illustrating spherical aberration, astigmatism, distortion, and lateral aberration at an intermediate focal length.
Figure 13:
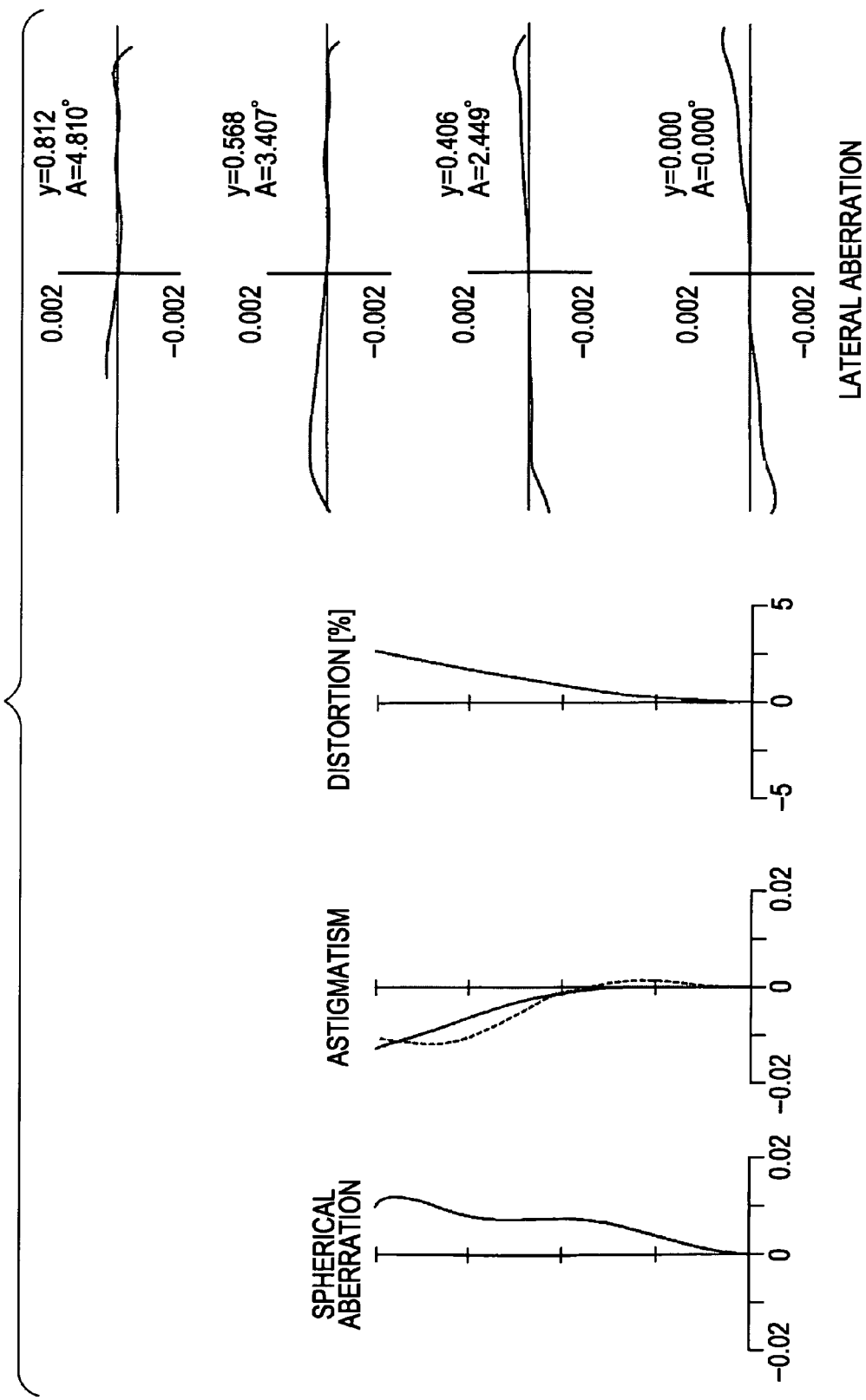
FIG. 13 is a diagram illustrating spherical aberration, astigmatism, distortion, and lateral aberration at a telephoto end.

FIGS. 11 to 13 show all aberrations in an infinity focus state in Numerical example 3. FIG. 11 shows all aberrations at the wide-angle end (focal length f=1.000), FIG. 12 shows all aberrations at an intermediate focal length (focal length f=2.101), and FIG. 13 shows all aberrations at the telephoto end (focal length f=9.414).

In the astigmatism diagrams shown in FIGS. 11 to 13, a solid line indicates a value on a sagittal image surface and a dashed line indicates a meridional image surface. In the lateral aberration diagrams, "y" indicates an image height and "A" indicates a half angle of view.

As can be seen from each aberration diagram, in Numerical example 3, all aberrations are effectively corrected and a high imaging performance is obtained.

Fourth Embodiment

Figure 14:
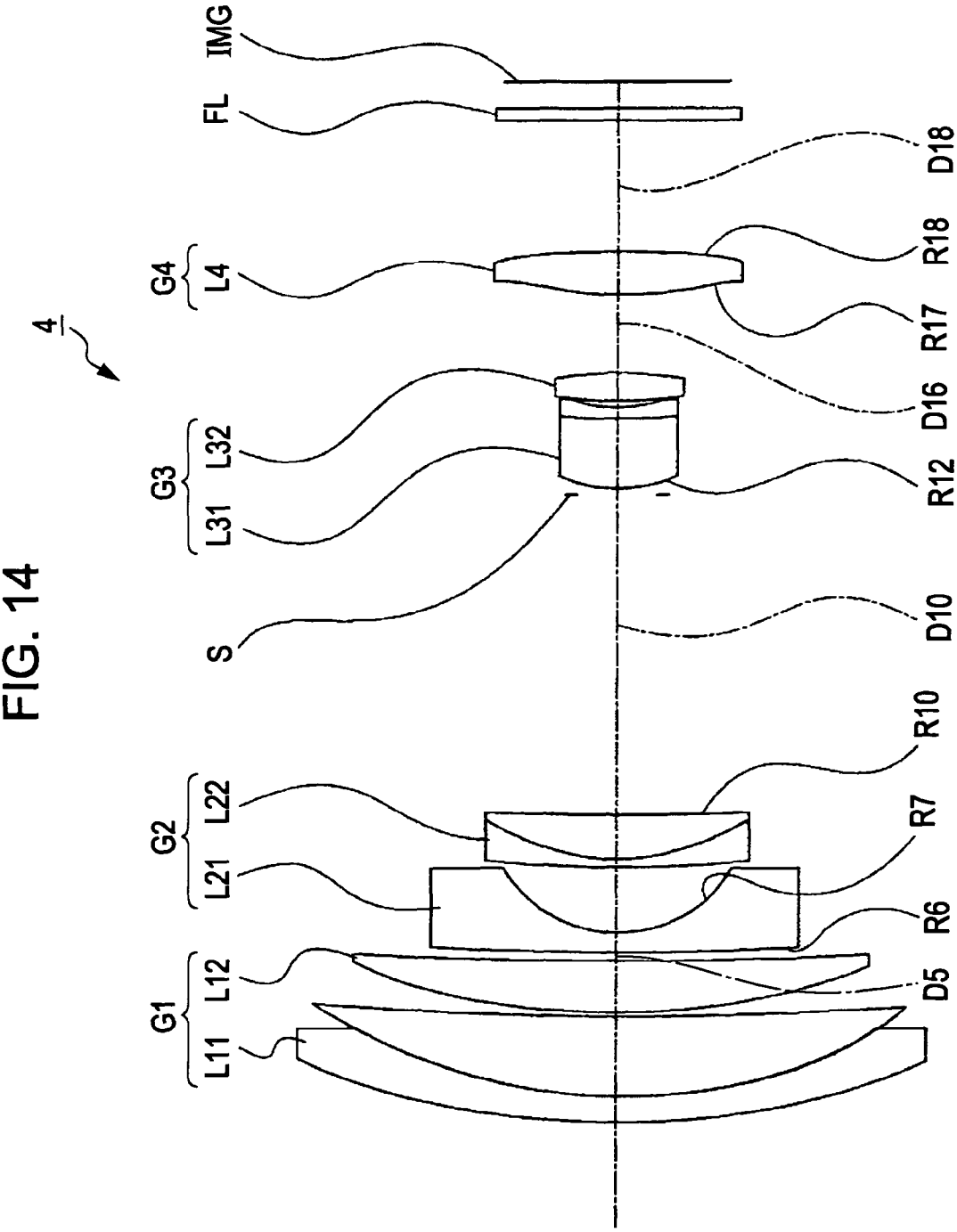
FIG. 14 is a diagram illustrating the lens structure of a variable focal length lens system according to a fourth embodiment of the invention.

FIG. 14 is a diagram illustrating the lens structure of a variable focal length lens system 4 according to a fourth embodiment of the invention. The variable focal length lens system 4 includes 10 lenses.

A first lens group G1 includes a cemented lens L11 of a meniscus-shaped negative lens having a convex surface facing the object side and a first positive lens having a convex surface facing the object side, and a meniscus-shaped second positive lens L12 having a convex surface facing the object side.

A second lens group G2 includes a meniscus-shaped first negative lens L21 having a concave surface facing the image side and a cemented lens L22 of a second negative lens having a concave surface facing the image side and a positive lens having a convex surface facing the object side.

A third lens group G3 includes a cemented lens L31 of a first positive lens having a convex surface facing the object side and a negative lens having a concave surface facing the image side and a second positive lens L32 having a biconvex shape.

A fourth lens group G4 includes a positive lens L4 having a biconvex shape.

A filter FL is provided between the fourth lens group G4 and an image surface IMG.

Table 10 shows lens data of Numerical example 4 in which detailed numerical values are applied to the variable focal length lens system 4 according to the fourth embodiment.

TABLE 10

| f | 1.00~2.10~9.43 | | | |
|---|---|---|---|---|
| Fno | 3.58~4.38~5.76 | | | |
| 2ω | 87.33~42.16~9.59 | | | |

| SURFACE NUMBER | CURVATURE RADIUS | SURFACE SPACING | REFRACTIVE INDEX | ABBE NUMBER |
|---|---|---|---|---|
| 1 | 6.3953 | 0.214 | 1.84666 | 23.83 |
| 2 | 4.2727 | 0.704 | 1.49700 | 81.60 |
| 3 | 21.9577 | 0.045 | | |
| 4 | 5.9937 | 0.426 | 1.77250 | 49.62 |
| 5 | 29.4615 | (D5) | | |
| 6 | 16.3833 (ASP) | 0.181 | 1.88072 | 37.27 |
| 7 | 1.0756 (ASP) | 0.555 | | |
| 8 | 11.2892 | 0.079 | 1.65100 | 56.16 |
| 9 | 1.7689 | 0.396 | 2.00178 | 19.32 |
| 10 | 4.8697 (ASP) | (D10) | | |
| 11(S) | 0.0000 | 0.079 | | |
| 12 | 1.1021 (ASP) | 0.603 | 1.75700 | 47.82 |
| 13 | 11.2892 | 0.090 | 1.80518 | 25.42 |
| 14 | 1.0443 | 0.060 | | |
| 15 | 2.9154 | 0.262 | 1.61800 | 63.39 |
| 16 | −2.3470 | (D16) | | |
| 17 | 3.0353 (ASP) | 0.332 | 1.49700 | 81.61 |
| 18 | −225.7846 (ASP) | (D18) | | |
| 19 | 0.0000 | 0.113 | 1.51680 | 64.20 |
| 20 | 0.0000 | (Bf) | | |

In the variable focal length lens system 4, aspheric surfaces are an object-side surface (R6) of the first negative lens L21 in the second lens group G2, an image-side surface (R7) of the first negative lens L21 in the second lens group G2, a surface (R10) of the cemented lens L22 that is closest to the image side in the second lens group G2, a surface (R12) of the cemented lens L31 that is closest to the object side in the third lens group G3, an object-side surface (R17) of the positive lens L4 in the fourth lens group G4, and an image-side surface (R18) of the positive lens L4 in the fourth lens group G4. Table 11 shows the conic constants K and the 4th-order, 6th-order, 8th-order, and 10th-order aspheric coefficients A, B, C, and D of the aspheric surfaces in Numerical example 4.

TABLE 11

| | | | | | |
|---|---|---|---|---|---|
| SIXTH SURFACE | K = 0.0000 | K = 0.198973E−01 | K = −0.267123E−01 | K = 0.815779E−02 | K = −0.844254E−03 |
| SEVENTH SURFACE | K = −0.1785 | K = 0.536377E−01 | K = 0.838391E−03 | K = 0.366110E−01 | K = −0.967430E−01 |

TABLE 11-continued

| TENTH SURFACE | K = 0.0000 | K = −0.353608E−01 | K = −0.965007E−02 | K = −0.650992E−02 | K = 0.163658E−01 |
|---|---|---|---|---|---|
| TWELFTH SURFACE | K = −0.5698 | K = −0.890215E−02 | K = 0.147378E+00 | K = −0.987447E+00 | K = 0.250887E+01 |
| SEVENTEENTH SURFACE | K = −10.0000 | K = 0.174112E−01 | K = −0.294974E−01 | K = −0.205541E−01 | K = 0.393615E−02 |
| EIGHTEENTH SURFACE | K = 0.0000 | K = −0.219608E−01 | K = −0.496665E−01 | K = 0.000000E+00 | K = 0.000000E+00 |

In the variable focal length lens system 4, when power varies between the wide-angle end and the telephoto end, a surface spacing D5 between the first lens group G1 and the second lens group G2, a surface spacing D10 between the second lens group G2 and the aperture diaphragm S, a surface spacing D16 between the third lens group G3 and the fourth lens group G4, and a surface spacing D18 between the fourth lens group G4 and the filter FL vary. Table 12 shows the F number Fno, the angle 2ω of view, and the variable surface spacings at the wide-angle end (focal length f=1.000), an intermediate focal length (focal length f=2.100), and the telephoto end (focal length f=9.434) in Numerical example 4.

As can be seen from each aberration diagram, in Numerical example 4, all aberrations are effectively corrected and a high imaging performance is obtained.

[Values of Conditional Expressions]

Table 13 shows the values of Conditional expressions 1 to 8 in the variable focal length lens systems 1 to 4.

That is, Table 13 shows fw, R23, and fw/R23 of Conditional expression 1, fw, R24, and fw/R24 of Conditional expression 2, fw, f2c, and fw/f2c of Conditional expression 3, f1, fw, ft, and f1/(fw·ft)$^{1/2}$ of Conditional expression 4, f1, f1c, and f1/f1c of Conditional expression 5, dS3, R31, and dS3/R31 of Conditional expression 6, f3, fw, and f3/fw of Conditional expression 7, and β2t and 1/β2t of Conditional expression 8.

TABLE 13

|  |  | VARIABLE FOCAL LENGTH LENS SYSTEM 1 | VARIABLE FOCAL LENGTH LENS SYSTEM 2 | VARIABLE FOCAL LENGTH LENS SYSTEM 3 | VARIABLE FOCAL LENGTH LENS SYSTEM 4 |
|---|---|---|---|---|---|
|  | fw | 1.000 | 1.000 | 1.000 | 1.000 |
|  | R23 | 38.3310 | 53.4131 | 22.5561 | 11.2892 |
| CONDITIONAL EXPRESSION 1 | fw/R23 | 0.026 | 0.019 | 0.044 | 0.089 |
|  | R24 | 1.9169 | 1.9169 | 1.9173 | 1.7689 |
| CONDITIONAL EXPRESSION 2 | fw/R24 | 0.522 | 0.522 | 0.522 | 0.566 |
|  | f2c | 38.142 | 40.797 | 24.819 | 16.468 |
| CONDITIONAL EXPRESSION 3 | fw/f2c | 0.026 | 0.025 | 0.040 | 0.061 |
|  | f1 | 7.793 | 7.582 | 7.746 | 7.715 |
|  | ft | 9.420 | 9.418 | 9.414 | 9.434 |
| CONDITIONAL EXPRESSION 4 | f1/(fw · ft)$^{1/2}$ | 2.539 | 2.471 | 2.525 | 2.512 |
|  | f1c | 10.715 | 10.226 | 9.584 | 9.654 |
| CONDITIONAL EXPRESSION 5 | f1/f1c | 0.727 | 0.741 | 0.808 | 0.808 |
|  | dS3 | 0.090 | 0.090 | 0.079 | 0.079 |
|  | R31 | 1.0195 | 1.0483 | 1.0684 | 1.1021 |
| CONDITIONAL EXPRESSION 6 | dS3/R31 | 0.088 | 0.086 | 0.074 | 0.072 |
|  | f3 | 2.134 | 2.135 | 2.180 | 2.178 |
| CONDITIONAL EXPRESSION 7 | f3/fw | 2.134 | 2.135 | 2.180 | 2.178 |
|  | β2t | −1.079 | −1.073 | −1.091 | −1.076 |
| CONDITIONAL EXPRESSION 8 | 1/β2t | −0.927 | −0.932 | −0.917 | −0.929 |

TABLE 12

| f | 1.000 | 2.100 | 9.434 |
|---|---|---|---|
| D5 | 0.079 | 1.335 | 4.269 |
| D10 | 2.754 | 1.331 | 0.056 |
| D16 | 0.681 | 1.236 | 3.201 |
| D18 | 1.148 | 1.418 | 0.522 |
| Bf | 0.228 | 0.228 | 0.228 |

Figure 15:
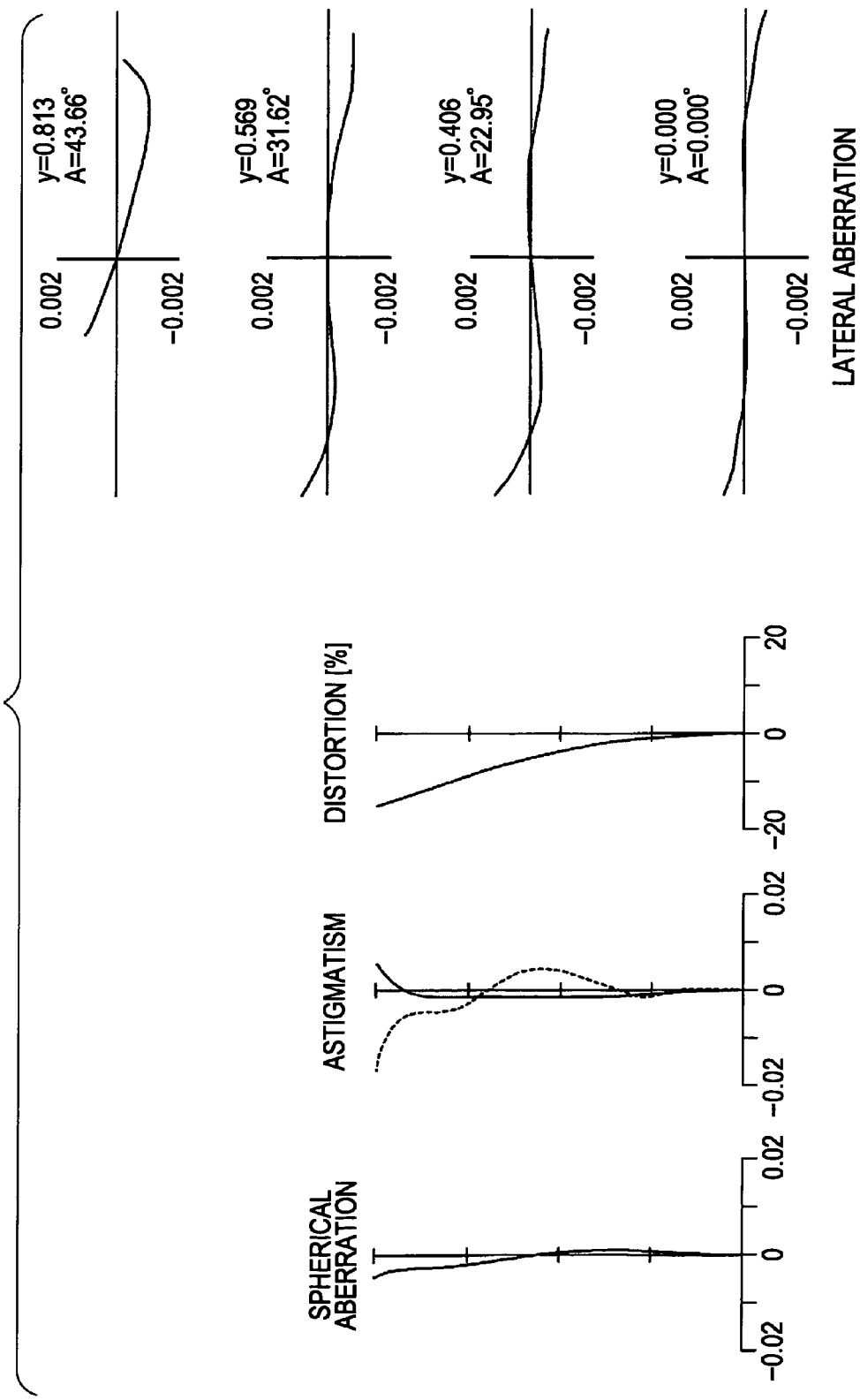
FIG. 15 is an aberration diagram illustrating a numerical example in which detailed numerical values are applied to the fourth embodiment together with FIGS. 16 and 17, and shows spherical aberration, astigmatism, distortion, and lateral aberration at a wide-angle end.
Figure 16:
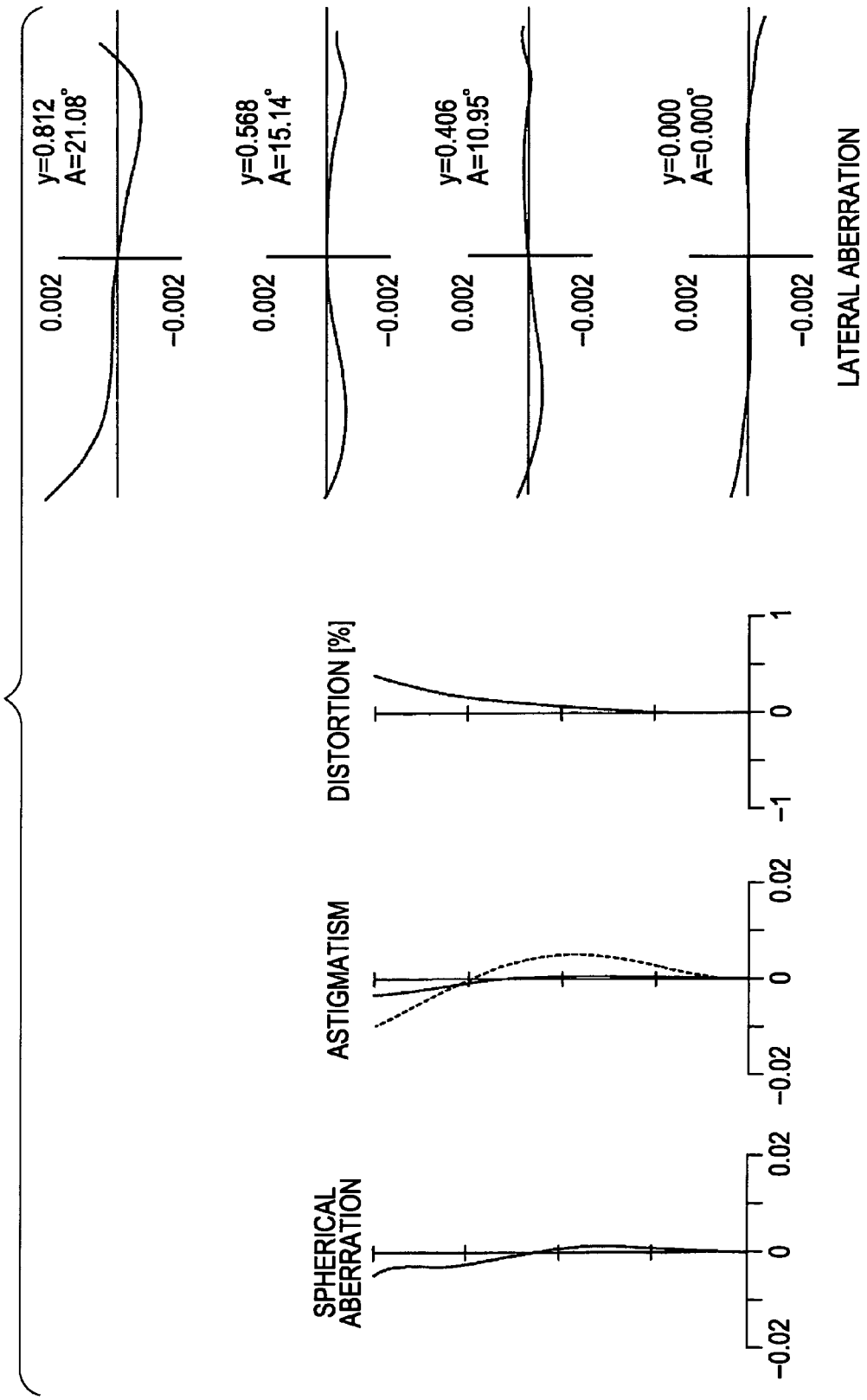
FIG. 16 is a diagram illustrating spherical aberration, astigmatism, distortion, and lateral aberration at an intermediate focal length.
Figure 17:
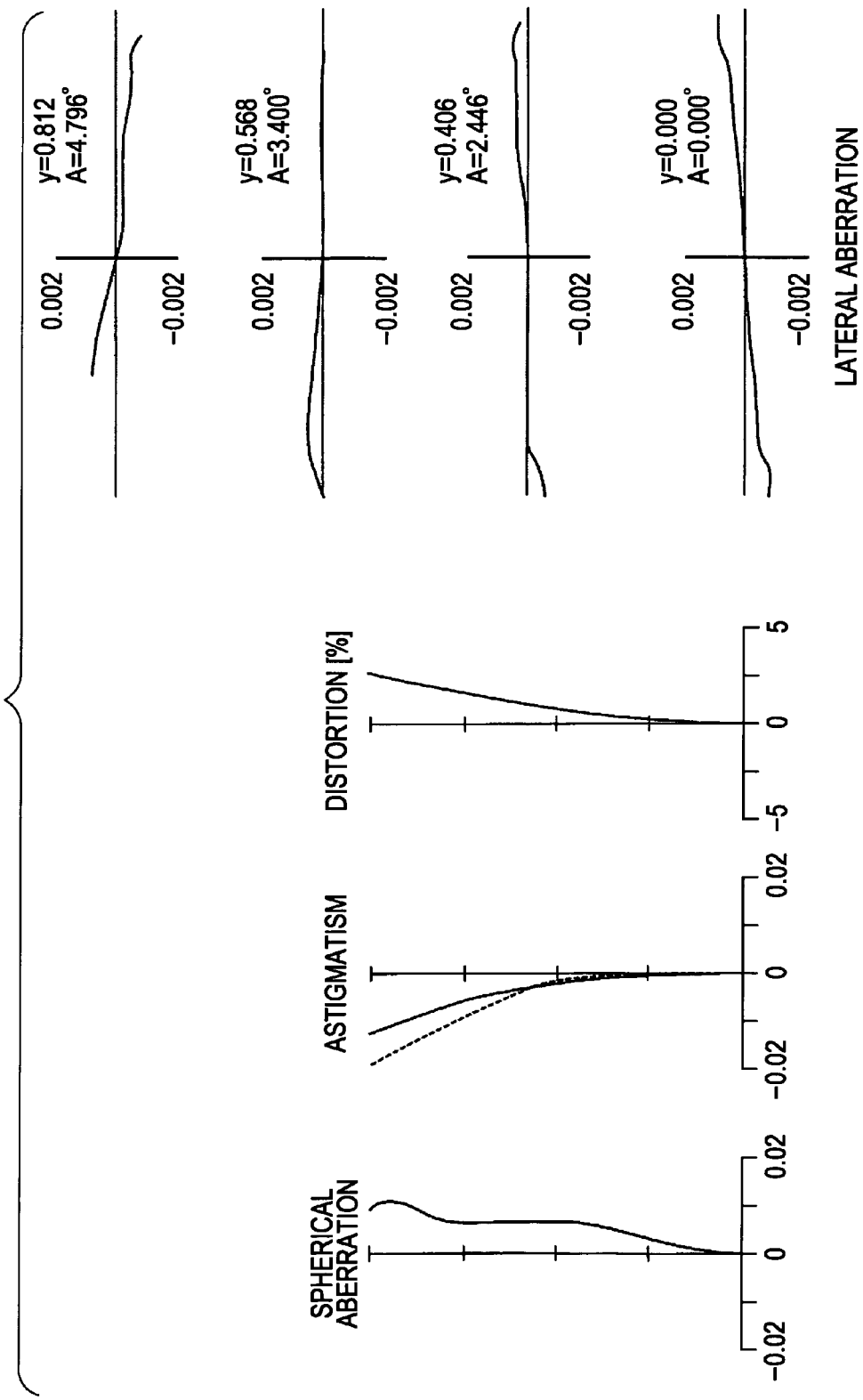
FIG. 17 is a diagram illustrating spherical aberration, astigmatism, distortion, and lateral aberration at a telephoto end.

FIGS. 15 to 17 show all aberrations in an infinity focus state in Numerical example 4. FIG. 15 shows all aberrations at the wide-angle end (focal length f=1.000), FIG. 16 shows all aberrations at an intermediate focal length (focal length f=2.100), and FIG. 17 shows all aberrations at the telephoto end (focal length f=9.434).

In the astigmatism diagrams shown in FIGS. 15 to 17, a solid line indicates a value on a sagittal image surface and a dashed line indicates a meridional image surface. In the lateral aberration diagrams, "y" indicates an image height and "A" indicates a half angle of view.

As can be seen from Table 13, the variable focal length lens systems 1 to 4 satisfy Conditional expressions 1 to 8.

[Structure of Imaging Apparatus]

Next, an imaging apparatus according to an embodiment of the invention will be described.

The imaging apparatus according to the embodiment of the invention includes a variable focal length lens system and an imaging device that converts an optical image formed by the variable focal length lens system into electric signals.

In the imaging apparatus according to the embodiment of the invention, the variable focal length lens system includes a first lens group with a positive refractive power, a second lens group with a negative refractive power, a third lens group with a positive refractive power, and a fourth lens group with a positive refractive power arranged in this order from the object side to the image side.

In the variable focal length lens system of the imaging apparatus according to the embodiment of the invention, when the position of the lens is changed from the wide-angle end to the telephoto end, the gap between the first lens group and the second lens group increases, and the gap between the second lens group and the third lens group decreases. Therefore, the gap between the third lens group and the fourth lens group is changed.

In the variable focal length lens system of the imaging apparatus according to the embodiment of the invention, when the position of the lens is changed from the wide-angle end to the telephoto end, all of the lens groups are moved. The aperture diaphragm is arranged in the vicinity of the third lens group and the fourth lens group is moved during close-distance focusing.

In the variable focal length lens system of the imaging apparatus according to the embodiment of the invention, the second lens group includes a negative lens having a concave surface facing the image side and a cemented lens of a negative lens having a concave surface facing the image side and a meniscus-shaped positive lens having a convex surface facing the object side arranged in this order from the object side to the image side.

In the variable focal length lens system of the imaging apparatus according to the embodiment of the invention, a surface, which is closest to the object side, of the negative lens arranged on the object side and a surface of the cemented lens closest to the image side in the second lens group are aspheric surfaces.

In the imaging apparatus according to the embodiment of the invention, since the variable focal length lens system has the above-mentioned structure, it is possible to reduce the thickness of a lens after ensuring a necessary aberration correcting function. In addition, it is possible to reduce the size of the apparatus after ensuring a high optical performance.

Since the aspheric lenses are used, it is possible to achieve a higher optical performance. In particular, since the second lens group includes the aspheric lens, it is possible to effectively correct a variation in comatic aberration due to a change in the angle of view at the wide-angle end.

Since at least two surfaces, that is, a surface, which is closest to the object side, of the negative lens (first negative lens) arranged on the object side and a surface of the cemented lens closest to the image side in the second lens group are aspheric surfaces, it is possible to reduce the size of the lens system and improve performance at the wide-angle end.

In the imaging apparatus according to the embodiment of the invention, the variable focal length lens system is configured so as to satisfy the following Conditional expressions 1 and 2:

$-0.04 < fw/R23 < 0.18$; and  [Conditional expression 1]

$0.48 < fw/R24 < 0.72$  [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

In the imaging apparatus according to the embodiment of the invention, when the variable focal length lens system satisfies Conditional expression 1, it is possible to effectively correct a variation in spherical aberration due to a change in the position of a lens and make the off-axis ray passing through the first negative lens close to the optical axis. Therefore, it is possible to reduce the diameter of the lens.

In the imaging apparatus according to the embodiment of the invention, when the variable focal length lens system satisfies Conditional expression 2, it is possible to effectively correct aberrations occurring in the cemented surface of the cemented lens. Therefore, it is possible to obtain a predetermined optical performance.

Figure 18:
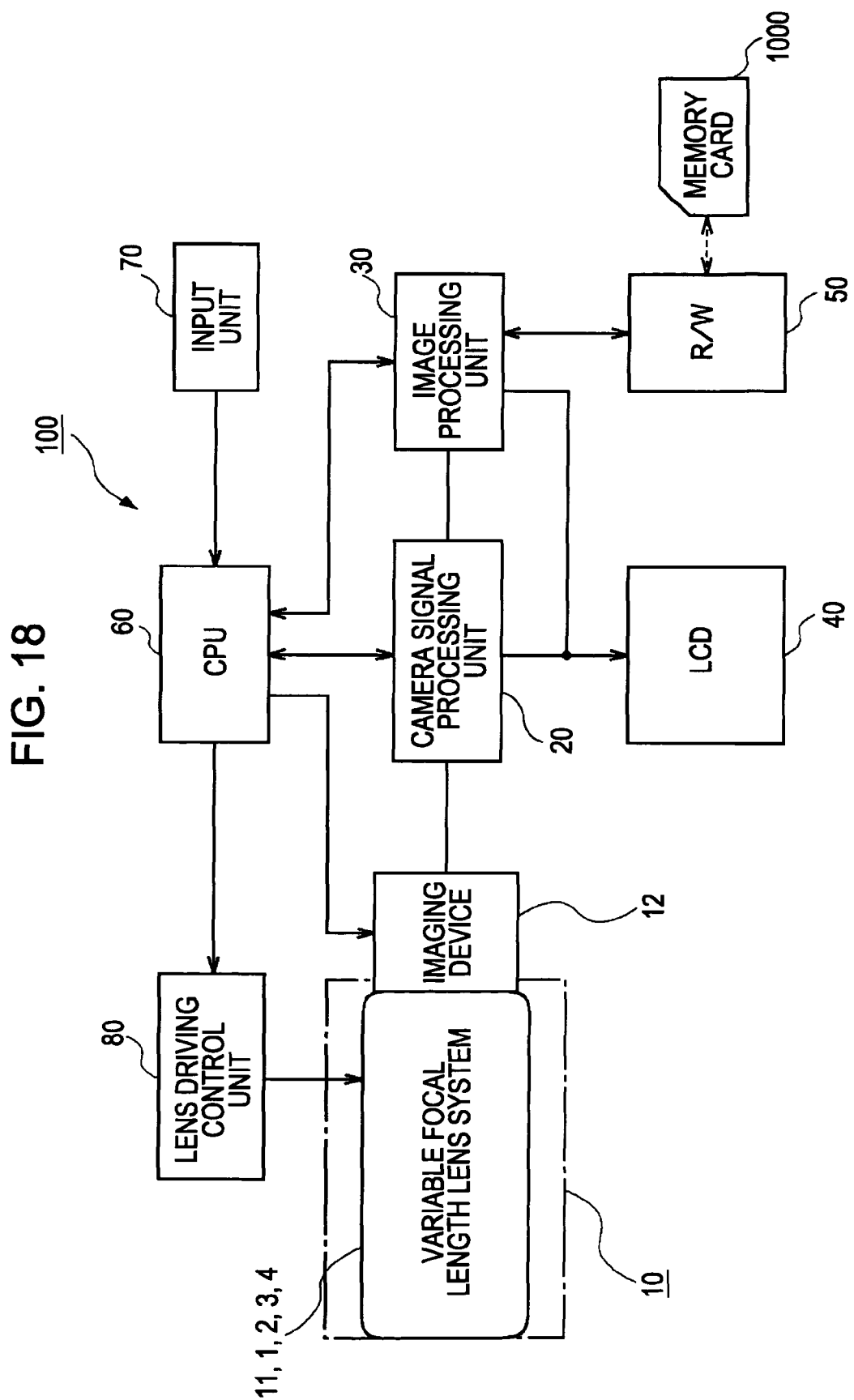
FIG. 18 is a block diagram illustrating an imaging apparatus according to an embodiment of the invention.

FIG. 18 is a block diagram illustrating a digital still camera, which is an example of the imaging apparatus according to the embodiment of the invention.

An imaging apparatus (digital still camera) 100 includes a camera block 10 having an imaging function, a camera signal processing unit 20 that performs signal processing, such as the conversion of an analog signal of the captured image into a digital signal, an image processing unit 30 that records or reproduces the image signal, an LCD (liquid crystal display) 40 that displays, for example, the captured image, an R/W (reader/writer) 50 that reads and writes the image signal from and to a memory card 1000, a CPU (central processing unit) 60 that controls the overall operation of the imaging apparatus, an input unit 70 including various kinds of switches that are operated by the user, and a lens driving control unit 80 that controls the driving of the lens provided in the camera block 10.

The camera block 10 includes, for example, an optical system including a variable focal length lens system 11 (the variable focal length lens system 1, 2, 3, or 4 according to the embodiments of the invention) and an imaging device 12, such as a CCD (charge coupled device) or a CMOS (complementary metal-oxide semiconductor).

The camera signal processing unit 20 performs various signal processing operations, such as the conversion of a signal output from the imaging device 12 into a digital signal, noise removal, image quality correction, and the conversion of luminance into a color-difference signal.

The image processing unit 30 performs a process of compressing and encoding an image signal, a process of decompressing and decoding an image signal, and a process of converting data specifications, such as resolution, on the basis of a predetermined image data format.

The LCD 40 has a function of displaying various kinds of data, such as the operation state of the input unit 70 by the user or the captured image.

The R/W 50 writes the image data encoded by the image processing unit 30 to the memory card 1000 and reads the image data written to the memory card 1000.

The CPU 60 functions as a control processing unit that controls each circuit block provided in the imaging apparatus 100, and controls each circuit block on the basis of an instruction input signal from the input unit 70.

The input unit 70 includes, for example, a shutter release button for a shutter operation and a selection switch for selecting the operation mode, and outputs an instruction input signal corresponding to the operation of the user to the CPU 60.

The lens driving control unit 80 controls, for example, a motor (not shown) that drives each lens of the variable focal length lens system 11, on the basis of control signals from the CPU 60.

The memory card 1000 is, for example, a semiconductor memory that is removable from a slot connected to the R/W 50.

[Operation of Imaging Apparatus]

Next, the operation of the imaging apparatus 100 will be described.

In an imaging standby state, the image signal captured by the camera block 10 is output to the LCD 40 through the camera signal processing unit 20 and is then displayed as a camera through image, under the control of the CPU 60. When an instruction input signal for zooming is input from the input unit 70, the CPU 60 outputs a control signal to the lens driving control unit 80, and the lens driving control unit 80 moves a predetermined lens of the variable focal length lens system 11.

When a shutter (not shown) of the camera block 10 is operated in response to the instruction input signal from the input unit 70, the captured image signal is output from the camera signal processing unit 20 to the image processing unit 30, and the image processing unit 30 compresses and encodes the image signal and converts it into digital data of predetermined data format. The converted data is output to the R/W 50, and the R/W 50 writes the data to the memory card 1000.

For example, when the shutter release button of the input unit 50 is pressed halfway or it is fully pressed for recording (imaging), the lens driving control unit 80 moves a predetermined lens of the variable focal length lens system 11 on the basis of the control signal from the CPU 60, thereby performing focusing.

When the input unit 70 is operated to reproduce image data stored in the memory card 1000, the R/W 50 reads predetermined image data from the memory card 1000, and the image processing unit 30 decompresses and decodes the image data. Then, the reproduction image signal is output to the LCD 40, and the reproduction image is displayed thereon.

In the above-described embodiments, the imaging apparatus is applied to the digital still camera, but the application range of the imaging apparatus is not limited to the digital still camera. For example, the imaging apparatus may be widely used as camera units of digital input/output apparatuses, such as a digital video camera, a mobile phone having a camera incorporated thereinto, and a PDA (personal digital assistant) having a camera incorporated thereinto.

The present application contains subject matter related to that disclosed in Japanese Priority Patent Application JP 2009-023705 filed in the Japan Patent Office on Feb. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable focal length lens system comprising:
a first lens group with a positive refractive power;
a second lens group with a negative refractive power;
a third lens group with a positive refractive power; and
a fourth lens group with a positive refractive power,
wherein the first to fourth lens groups are arranged in this order from an object side to an image side,
when the position of a lens is changed from a wide-angle end to a telephoto end, a gap between the first lens group and the second lens group increases, a gap between the second lens group and the third lens group decreases, and a gap between the third lens group and the fourth lens group is changed,
when the position of the lens is changed from the wide-angle end to the telephoto end, all of the lens groups are moved,
an aperture diaphragm is arranged in the vicinity of the third lens group,
the fourth lens group is moved during close-distance focusing,
the second lens group includes a negative lens having a concave surface facing an image side and a cemented lens of a negative lens having a concave surface facing the image side and a meniscus-shaped positive lens having a convex surface facing the object side arranged in this order from the object side to the image side,
a surface, which is closest to the object side, of the negative lens arranged on the object side in the second lens group and a surface of the cemented lens closest to the image side are aspheric surfaces, and
the variable focal length lens system satisfies the following Conditional expressions 1 and 2:

$-0.04 < fw/R23 < 0.18$, and  [Conditional expression 1]

$0.48 < fw/R24 < 0.72$  [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

2. The variable focal length lens system according to claim 1, wherein the variable focal length lens system satisfies the following Conditional expression 3:

$0.01 < fw/f2c < 0.09$  [Conditional expression 3]

(where f2c indicates the focal length of the cemented lens in the second lens group).

3. The variable focal length lens system according to claim 2, wherein the first lens group includes a negative lens having a concave surface facing the image side, a first positive lens having a convex surface facing the object side, and a second positive lens having a convex surface facing the object side arranged in this order from the object side to the image side, and
the variable focal length lens system satisfies the following Conditional expression 4:

$2.3 < f1/(fw \cdot ft)^{1/2} < 2.7$  [Conditional expression 4]

(where f1 indicates the focal length of the first lens group and ft indicates the focal length of the entire lens system at the telephoto end).

4. The variable focal length lens system according to claim 3, wherein the variable focal length lens system satisfies the following Conditional expression 5:

$0.65 < f1/f1c < 0.9$  [Conditional expression 5]

(where f1c indicates the focal length of the second positive lens in the first lens group).

5. The variable focal length lens system according to claim 4, wherein the aperture diaphragm is arranged on the object side of the third lens group,
when the position of the lens is changed, the aperture diaphragm is moved integrally with the third lens group, and
the variable focal length lens system satisfies the following Conditional expression 6:

$0.06 < dS3/R31 < 0.10$  [Conditional expression 6]

(where dS3 indicates a distance between the aperture diaphragm and a surface closest to the object side in the third lens group along an optical axis and R31 indicates the curvature radius of the surface closest to the object side in the third lens group).

6. The variable focal length lens system according to claim 5, wherein the variable focal length lens system satisfies the following Conditional expression 7:

$2 < f3/fw < 2.3$  [Conditional expression 7]

(where f3 indicates the focal length of the third lens group).

7. The variable focal length lens system according to claim 3,
wherein the aperture diaphragm is arranged on the object side of the third lens group,
when the position of the lens is changed, the aperture diaphragm is moved integrally with the third lens group, and
the variable focal length lens system satisfies the following Conditional expression 6:

$$0.06 < dS3/R31 < 0.10 \quad \text{[Conditional expression 6]}$$

(where dS3 indicates a distance between the aperture diaphragm and a surface closest to the object side in the third lens group along an optical axis and R31 indicates the curvature radius of the surface closest to the object side in the third lens group).

8. The variable focal length lens system according to claim 7, wherein the variable focal length lens system satisfies the following Conditional expression 7:

$$2 \leq f3/fw < 2.3 \quad \text{[Conditional expression 7]}$$

(where f3 indicates the focal length of the third lens group).

9. The variable focal length lens system according to claim 2,
wherein the aperture diaphragm is arranged on the object side of the third lens group,
when the position of the lens is changed, the aperture diaphragm is moved integrally with the third lens group, and
the variable focal length lens system satisfies the following Conditional expression 6:

$$0.06 < dS3/R31 < 0.10 \quad \text{[Conditional expression 6]}$$

(where dS3 indicates a distance between the aperture diaphragm and a surface closest to the object side in the third lens group along an optical axis and R31 indicates the curvature radius of the surface closest to the object side in the third lens group).

10. The variable focal length lens system according to claim 9, wherein the variable focal length lens system satisfies the following Conditional expression 7:

$$2 \leq f3/fw < 2.3 \quad \text{[Conditional expression 7]}$$

(where f3 indicates the focal length of the third lens group).

11. The variable focal length lens system according to claim 1,
wherein the first lens group includes a negative lens having a concave surface facing the image side, a first positive lens having a convex surface facing the object side, and a second positive lens having a convex surface facing the object side arranged in this order from the object side to the image side, and
the variable focal length lens system satisfies the following Conditional expression 4:

$$2.3 < f1/(fw \cdot ft)^{1/2} < 2.7 \quad \text{[Conditional expression 4]}$$

(where f1 indicates the focal length of the first lens group and ft indicates the focal length of the entire lens system at the telephoto end).

12. The variable focal length lens system according to claim 11, wherein the variable focal length lens system satisfies the following Conditional expression 5:

$$0.65 < f1/f1c < 0.9 \quad \text{[Conditional expression 5]}$$

(where f1c indicates the focal length of the second positive lens in the first lens group).

13. The variable focal length lens system according to claim 12,
wherein the aperture diaphragm is arranged on the object side of the third lens group,
when the position of the lens is changed, the aperture diaphragm is moved integrally with the third lens group, and
the variable focal length lens system satisfies the following Conditional expression 6:

$$0.06 < dS3/R31 < 0.10 \quad \text{[Conditional expression 6]}$$

(where dS3 indicates a distance between the aperture diaphragm and a surface closest to the object side in the third lens group along an optical axis and R31 indicates the curvature radius of the surface closest to the object side in the third lens group).

14. The variable focal length lens system according to claim 13, wherein the variable focal length lens system satisfies the following Conditional expression 7:

$$2 \leq f3/fw < 2.3 \quad \text{[Conditional expression 7]}$$

(where f3 indicates the focal length of the third lens group).

15. The variable focal length lens system according to claim 11,
wherein the aperture diaphragm is arranged on the object side of the third lens group,
when the position of the lens is changed, the aperture diaphragm is moved integrally with the third lens group, and
the variable focal length lens system satisfies the following Conditional expression 6:

$$0.06 < dS3/R31 < 0.10 \quad \text{[Conditional expression 6]}$$

(where dS3 indicates a distance between the aperture diaphragm and a surface closest to the object side in the third lens group along an optical axis and R31 indicates the curvature radius of the surface closest to the object side in the third lens group).

16. The variable focal length lens system according to claim 15, wherein the variable focal length lens system satisfies the following Conditional expression 7:

$$2 \leq f3/fw < 2.3 \quad \text{[Conditional expression 7]}$$

(where f3 indicates the focal length of the third lens group).

17. The variable focal length lens system according to claim 1,
wherein the aperture diaphragm is arranged on the object side of the third lens group,
when the position of the lens is changed, the aperture diaphragm is moved integrally with the third lens group, and
the variable focal length lens system satisfies the following Conditional expression 6:

$$0.06 < dS3/R31 < 0.10 \quad \text{[Conditional expression 6]}$$

(where dS3 indicates a distance between the aperture diaphragm and a surface closest to the object side in the third lens group along an optical axis and R31 indicates the curvature radius of the surface closest to the object side in the third lens group).

18. The variable focal length lens system according to claim 17, wherein the variable focal length lens system satisfies the following Conditional expression 7:

$$2 \leq f3/fw < 2.3 \quad \text{[Conditional expression 7]}$$

(where f3 indicates the focal length of the third lens group).

19. An imaging apparatus comprising:
a variable focal length lens system; and
an imaging device configured to convert an optical image formed by the variable focal length lens system into an electric signal,
wherein the variable focal length lens system includes:
a first lens group with a positive refractive power;
a second lens group with a negative refractive power;
a third lens group with a positive refractive power; and
a fourth lens group with a positive refractive power,
the first to fourth lens groups are arranged in this order from an object side to an image side,
when the position of a lens is changed from a wide-angle end to a telephoto end, a gap between the first lens group and the second lens group increases, a gap between the second lens group and the third lens group decreases, and a gap between the third lens group and the fourth lens group is changed,
when the position of the lens is changed from the wide-angle end to the telephoto end, all of the lens groups are moved,
an aperture diaphragm is arranged in the vicinity of the third lens group,
the fourth lens group is moved during close-distance focusing,
the second lens group includes a negative lens having a concave surface facing an image side and a cemented lens of a negative lens having a concave surface facing the image side and a meniscus-shaped positive lens having a convex surface facing the object side arranged in this order from the object side to the image side,
a surface, which is closest to the object side, of the negative lens arranged on the object side in the second lens group and a surface of the cemented lens closest to the image side are aspheric surfaces, and
the variable focal length lens system satisfies the following Conditional expressions 1 and 2:

$-0.04 < fw/R23 < 0.18$, and  [Conditional expression 1]

$0.48 < fw/R24 < 0.72$  [Conditional expression 2]

(where fw indicates the focal length of the entire lens system at the wide-angle end, R23 indicates the curvature radius of a surface of the cemented lens closest to the object side in the second lens group, and R24 indicates the curvature radius of a cemented surface of the cemented lens in the second lens group).

* * * * *